(12) United States Patent
Ochiai et al.

(10) Patent No.: US 7,284,013 B2
(45) Date of Patent: Oct. 16, 2007

(54) SYSTEM FOR SEARCHING DEVICE ON NETWORK

(75) Inventors: Masato Ochiai, Kanagawa-ken (JP); Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 10/683,102

(22) Filed: Oct. 10, 2003

(65) Prior Publication Data

US 2004/0083210 A1    Apr. 29, 2004

Related U.S. Application Data

(63) Continuation of application No. 09/609,224, filed on Jun. 30, 2000, now abandoned.

(30) Foreign Application Priority Data

Jul. 6, 1999    (JP) ................................. 11-192382
Jul. 13, 1999    (JP) ................................. 11-199532

(51) Int. Cl.
    *G06F 17/00*    (2006.01)
(52) U.S. Cl. ...................... 707/103 X; 707/3; 707/101; 707/102; 707/104.1
(58) Field of Classification Search ..................... 707/3, 707/10, 101, 102, 103 X, 104.1, 201, 203, 707/204, 205; 709/223; 719/231, 233
See application file for complete search history.

(56) References Cited

U.S. PATENT DOCUMENTS

| | | | |
|---|---|---|---|
| 5,586,254 A | 12/1996 | Kondo et al. .................. 714/25 |
| 5,796,951 A * | 8/1998 | Hamner et al. .............. 709/223 |
| 5,859,978 A | 1/1999 | Sonderegger et al. ......... 707/10 |
| 5,910,803 A | 6/1999 | Grau et al. .................. 345/357 |
| 5,935,217 A | 8/1999 | Sakai et al. ................. 709/249 |
| 5,999,945 A | 12/1999 | Lahey et al. ................ 707/200 |
| 6,041,349 A | 3/2000 | Sugauchi et al. ........... 709/223 |
| 6,041,364 A * | 3/2000 | Lortz et al. ................. 719/321 |
| 6,046,742 A | 4/2000 | Chari ......................... 345/734 |
| 6,049,827 A | 4/2000 | Sugauchi et al. ........... 709/223 |
| 6,076,106 A | 6/2000 | Hamner et al. ............. 709/223 |
| 6,078,575 A | 6/2000 | Dommety et al. .......... 370/338 |
| 6,100,812 A | 8/2000 | Tanaka et al. ......... 340/825.37 |
| 6,122,639 A * | 9/2000 | Babu et al. ............. 707/103 R |
| 6,181,341 B1 | 1/2001 | Shinagawa .................. 345/734 |

(Continued)

FOREIGN PATENT DOCUMENTS

EP    0614151    9/1994

(Continued)

*Primary Examiner*—Thuy N. Pardo
(74) *Attorney, Agent, or Firm*—Fitzpatrick, Cella, Harper & Scinto

(57) ABSTRACT

Location information of each device connected to a network is managed in a hierarchical structure to display the location of each device in a manner easy to be recognized by a user. The location information of each device connected to the network is managed in the hierarchical structure and layout bit maps are stored in each client. When a client issues a device search request, the hierarchical location of the device whose location search was requested can be identified, and the identified location of the device can be displayed in a way to be easily recognized. When the client displays the search result, it is unnecessary for a sever to transmit the layout bit map to the client.

9 Claims, 38 Drawing Sheets

U.S. PATENT DOCUMENTS

| | | | |
|---|---|---|---|
| 6,199,048 B1 | 3/2001 | Hudetz et al. | 705/23 |
| 6,263,060 B1 | 7/2001 | MeLampy et al. | 379/144 |
| 6,266,663 B1 | 7/2001 | Fuh et al. | 707/4 |
| 6,269,370 B1 | 7/2001 | Kirsch | 707/10 |
| 6,289,380 B1 | 9/2001 | Battat et al. | 709/224 |
| 6,347,336 B1 | 2/2002 | Song et al. | 709/223 |
| 6,374,293 B1 | 4/2002 | Dev et al. | 709/220 |
| 6,393,478 B1 | 5/2002 | Bahlmann | 709/224 |
| 6,460,032 B1 * | 10/2002 | Ludtke | 707/3 |
| 6,496,820 B1 | 12/2002 | Tada et al. | 707/5 |
| 6,553,431 B1 | 4/2003 | Yamamoto et al. | 710/8 |
| 2001/0052995 A1 | 12/2001 | Idehara | 358/1.15 |
| 2002/0035643 A1 | 3/2002 | Morita | 709/245 |
| 2002/0113816 A1 | 8/2002 | Mitchell et al. | 345/734 |

FOREIGN PATENT DOCUMENTS

| | | |
|---|---|---|
| EP | 0656581 | 6/1995 |
| EP | 1 058 417 | 12/2000 |
| EP | 1067731 | 1/2001 |
| JP | 05-323867 | 12/1993 |
| JP | 06-324823 | 11/1994 |
| JP | 07-336778 | 12/1995 |
| JP | 08-305520 | 11/1996 |
| JP | 09-244860 | 9/1997 |
| JP | 09-251434 | 9/1997 |
| JP | 09-326799 | 12/1997 |
| JP | 10-187390 | 7/1998 |
| JP | 10-320341 | 12/1998 |

* cited by examiner

FIG. 9

| | | | | | |
|---|---|---|---|---|---|
| 801 — NM | LBP1110 | MFP550 | LBP3310 | LBP3310 | SCN2160 |
| 802 — MAP | 10X+10Y | 5X+30Y | 10X+10Y | 15X+25Y | 5X+5Y |
| 803 — DV | PRINTER | MFP | PRINTER | PRINTER | SCANNER |
| 804 — BL | 2-1 | 2-1 | 2-2 | 1-1 | 1-2 |
| 805 — FL | 2F | 2F | 2F | 1F | 1F |
| 806 — BU | AA BUILDING | AA BUILDING | AA BUILDING | AA BUILDING | AA BUILDING |
| 807 — OP | EXTEND | EXTEND | EXTEND | EXTEND | EXTEND |
| 808 — BR | TOKYO BRANCH | TOKYO BRANCH | TOKYO BRANCH | TOKYO BRANCH | TOKYO BRANCH |
| 809 — O | ABC TRADING CO LTD. | ABC TRADING CO LTD. | ABC TRADING CO LTD. | ABC TRADING CO LTD. | ABC TRADING CO LTD. |
| 810 — C | JP | JP | JP | JP | JP |
| 811 — COLOR | TRUE | FALSE | FALSE | FALSE | FALSE |
| 812 — STAPLE | FALSE | TRUE | FALSE | TRUE | |
| 813 — DOUBLE-SIDED | FALSE | FALSE | TRUE | FALSE | |
| 814 — IP ADDRESS | 192.1.2.1 | 192.1.2.10 | 192.1.2.100 | 192.1.2.101 | 192.1.2.200 |

| | | |
|---|---|---|
| 901 | LOCATION INFORMATION TAG | |
| 902 | NM | LBP1110 |
| 903 | MAP | 10X+10Y |
| 904 | DV | PRINTER |
| 905 | BL | 2-1 |
| 906 | FL | 2F |
| 907 | BU | AA BUILDING |
| 908 | OP | EXTEND |
| 909 | BR | TOKYO BRANCH |
| 910 | O | ABC TRADING CO LTD. |
| 911 | C | JP |
| 912 | DEVICE ATTRIBUTE INFORMATION TAG | |
| 913 | COLOR | TRUE |
| 914 | STAPLE | FALSE |
| 915 | DOUBLE-SIDED | FALSE |
| 916 | IP ADDRESS | 192.1.2.1 |

900

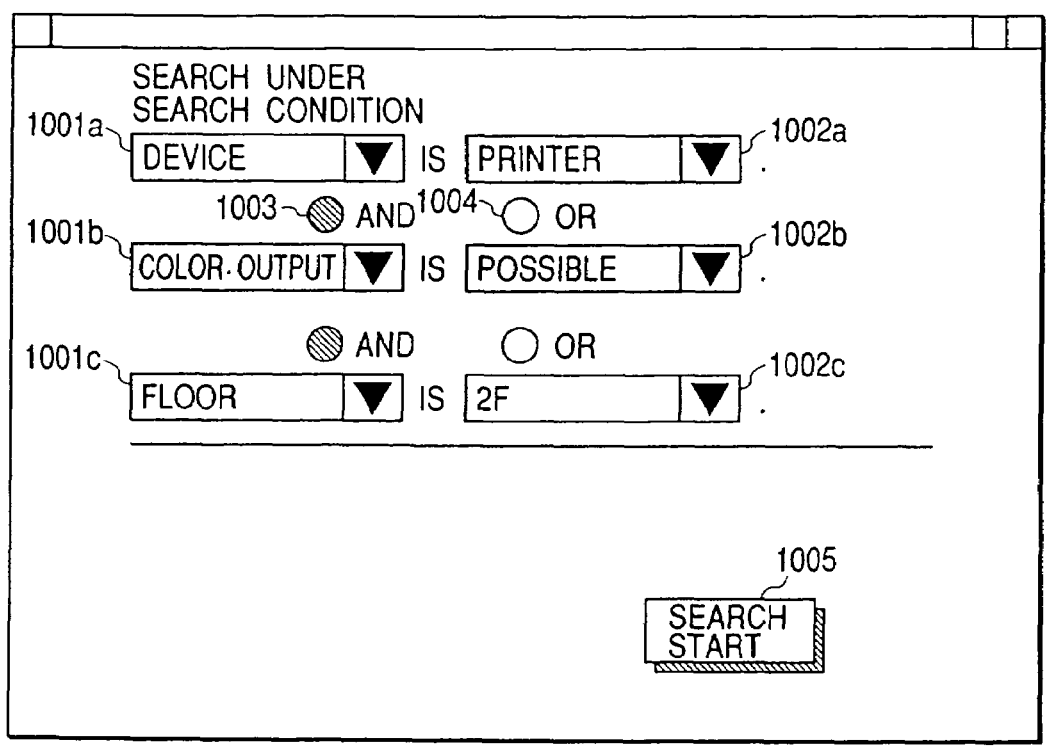

FIG. 14

| | | |
|---|---|---|
| NM | LBP1110 | 1301 |
| MAP | 10X+10Y | 1302 |
| DV | PRINTER | 1303 |
| BL | 2-1 | 1304 |
| FL | 2F | 1305 |
| BU | AA BUILDING | 1306 |
| OP | EXTEND | 1307 |
| BR | TOKYO BRANCH | 1308 |
| O | ABC TRADING CO LTD. | 1309 |
| C | JP | 1310 |
| COLOR | TRUE | 1311 |
| STAPLE | FALSE | 1312 |
| DOUBLE-SIDED | FALSE | 1313 |
| IP ADDRESS | 192.1.2.1 | 1314 |

(table 1300)

FIG. 15

C=JP, O=ABC TRADING CO LTD.,
BR=TOKYO BRANCH, OP=EXTEND,
BU=AA BUILDING

1401

| BL | BITMAP |
|---|---|
| 1-1 | MAP OF FIG. 16 |
| 1-2 | MAP OF FIG. 17 |
| 2-1 | MAP OF FIG. 18 |
| 2-2 | MAP OF FIG. 19 |
| ETC | MAP OF FIG. 20 |

(1402, 1403)

FIG. 21
| NM | BITMAP |
|---|---|
| 2001 — MFP6550 | 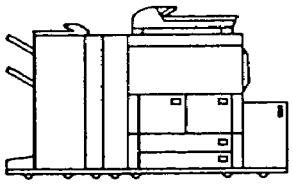 |
| 2002 — LBP1110 | 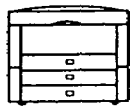 |
| 2003 — LBP3310 | 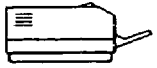 |
| 2004 — SCN2160 |  |
| 2005 — PC5330 |  |
| 2006 — NOTE5133 |  |
| 2007 — GY33115 | 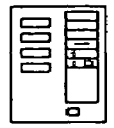 |
| 2008 — PC6450 | 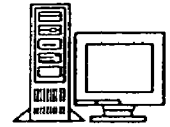 |
| 2009 — UNKOWN |  |

FIG. 31

| | 3101 | 3102 | 3103 | 3104 | 3105 |
|---|---|---|---|---|---|
| C O | JP | JP | JP | JP | JP |
| | ABC TRADING CO LTD. | ABC TRADING CO LTD. | ABC TRADING CO LTD. | ABC TRADING CO LTD. | ABC TRADING CO LTD. |
| BR | | TOKYO BRANCH | TOKYO BRANCH | TOKYO BRANCH | TOKYO BRANCH |
| OP | | EXTEND | EXTEND | EXTEND | EXTEND |
| BU | | | AA BUILDING | AA BUILDING | AA BUILDING |
| FL | | | | 2F | 1F |
| BL | | | | | |
| MAP | | | | | |
| CORRESPONDING MAP | MAP OF FIG. 33 | MAP OF FIG. 35 | MAP OF FIG. 37 | MAP OF FIG. 39 | MAP OF FIG. 41 |

| | 3106 | 3107 | 3108 | 3109 | 3110 |
|---|---|---|---|---|---|
| C O | JP | JP | JP | JP | – |
| | ABC TRADING CO LTD. | ABC TRADING CO LTD. | ABC TRADING CO LTD. | ABC TRADING CO LTD. | – |
| BR | TOKYO BRANCH | TOKYO BRANCH | TOKYO BRANCH | TOKYO BRANCH | – |
| OP | EXTEND | EXTEND | EXTEND | EXTEND | – |
| BU | AA BUILDING | AA BUILDING | AA BUILDING | AA BUILDING | – |
| FL | 1F | 1F | 2F | 2F | |
| BL | 1-1 | 1-2 | 2-1 | 2-2 | |
| MAP | | | | | |
| CORRESPONDING MAP | MAP OF FIG. 16 | MAP OF FIG. 17 | MAP OF FIG. 18 | MAP OF FIG. 19 | MAP OF FIG. 20 |

SYSTEM FOR SEARCHING DEVICE ON NETWORK

This application is a continuation of application Ser. No. 09/609,224, filed Jun. 30, 2000 now abandoned.

BACKGROUND OF THE INVENTION

1. Field of the Invention

The present invention relates to a system for searching a device on a network, and more particularly to a device searching system which can plainly display a searched device and its location information.

2. Related Background Art

Directory service has been provided as a method of efficiently searching and utilizing various resources (such as printers, servers and scanners) connected to a network.

Such directory service is, so to speak, a telephone directory of a network which stores various information. A specific example of a directory system using the directory service is LDAP (Lightweight Directory Access Protocol). The specifications of LDAP are described in RFC (Request For Comments) 1777 which is standard specifications issued by IETF (Internet Engineering Task Force).

For example, by searching a device connected to a network by using the directory service, a list of device terminals usable by the network can be obtained.

However, this list does not provide location information of a device terminal in a way easy to recognize.

A device search system has been desired which is suitable for notifying a user of device hierarchical location information in a way easy to confirm. For example, if the device is a network printer, the device hierarchical location information may be "location of a printer nearest to the user on this floor", "location of a color printer in a building" and the like.

SUMMARY OF THE INVENTION

Under the above-described circumstance, it is an object of the invention to hierarchically manage location information of devices connected to a network, identify the location of the device requested to search in a hierarchical structure, and display the identified device location for the user in a way easy to recognize.

It is another object of the present invention to provide a user with acquire hierarchically managed location information at a desired hierarchical level, as device search result.

According to an embodiment of the invention, a server, which manages a database registering a plurality piece of attribute information of devices on a network, has hierarchical location information representing the locations of the devices on the network in a hierarchical data structure, as the attribute information, receives at least one search condition including the attribute information from a client, and searches the device satisfying the search condition from the database. The search result including the hierarchical location information of the searched device is transmitted to the client.

According to another embodiment of the invention, a client, which enters a search condition for searching a device on a network, transmits a search request including the entered search condition to a search computer on the network, and receives hierarchical location information of the searched device as a search result for the search request. The location information of the searched device is displayed in accordance with the hierarchical location information contained in the search result.

According to another embodiment of the invention, a device on a network stores at least one piece of static attribute information representative of a performance of the device and hierarchical location information. The hierarchical location information has a plurality of hierarchical data logically discriminated. The stored static attribute information and hierarchical location information are transmitted to a server to store the information in a database.

Other objects and features of the present invention will become more apparent from the following description of embodiments when read in conjunction with the accompanying drawings.

BRIEF DESCRIPTION OF THE DRAWINGS

FIG. 9 is a diagram showing hierarchical location information and attribute information managed by a server computer.

FIG. 10 is a diagram showing hierarchical location information and attribute information registered for a device.

FIG. 12 is a diagram showing a specific example of a device search input window.

FIG. 13 is a diagram showing an example of device search conditions.

FIG. 14 is a diagram showing an example of device search results.

FIG. 15 is a diagram showing a bit map and hierarchical location information managed by a client computer.

FIG. 21 is a diagram showing device icons managed by the client computer.

FIG. 31 is a diagram showing an example of a map list corresponding to each hierarchical level to be searched.

DETAILED DESCRIPTION OF THE PREFERRED EMBODIMENTS

With reference to the accompanying drawings, embodiments of the invention will be described, the invention pertaining to a server, a client, a device terminal, a device search system, a device search method, respectively connected to a network, and a storage medium storing a program realizing the device search method.

Figure 1:
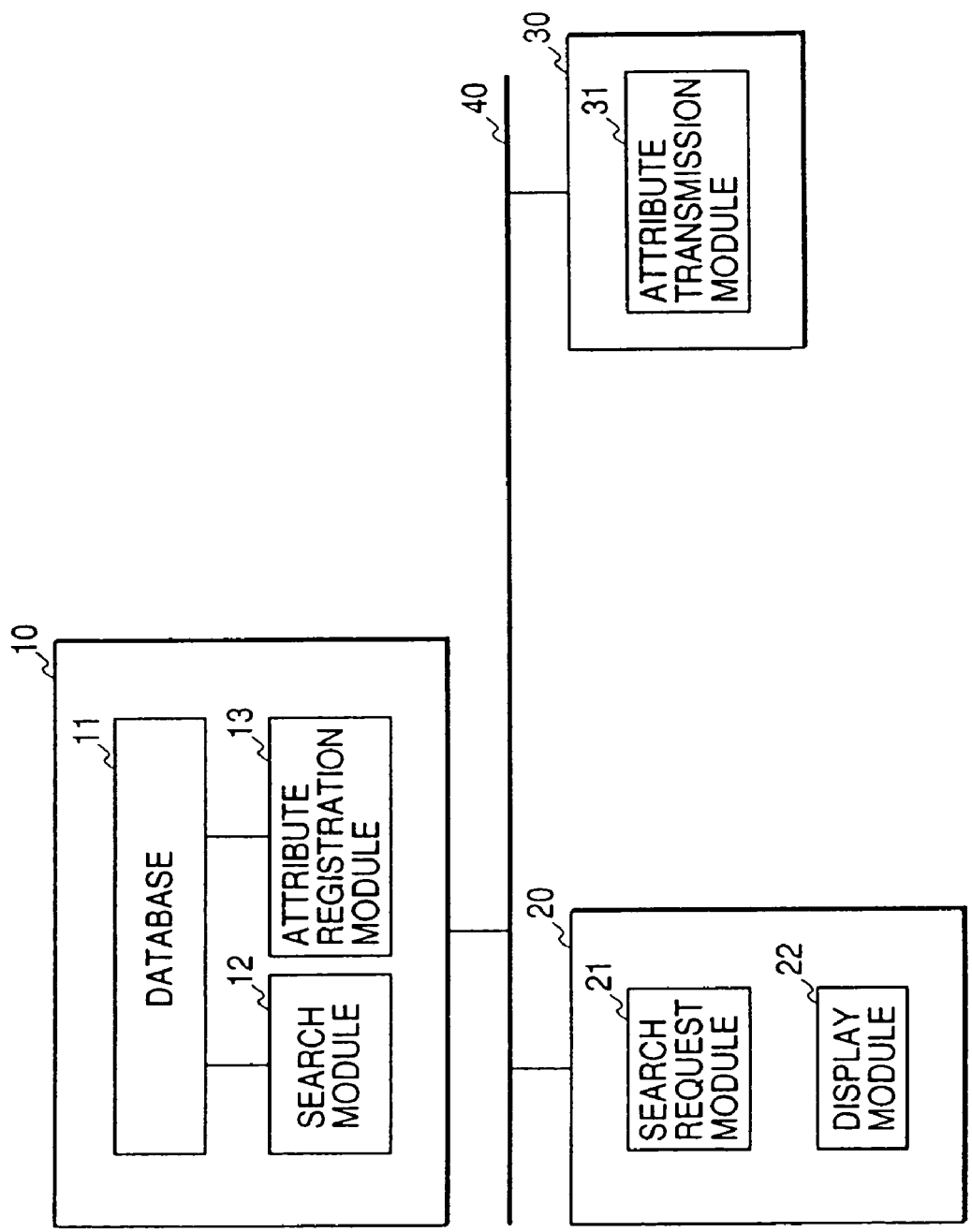
FIG. 1 is a diagram showing the structure of a device search system according to the invention.

FIG. 1 is a diagram showing the structure of a device search system of the invention.

As shown in FIG. 1, a client computer 20, a device terminal 30 and a server computer 10 are connected to a network 40.

The client 20 may be a general computer or the like. The client 20 comprises a search module 21 and a display module 22. The search module 21 transmits a desired device search condition to the server 10 and receives the search result. The display module 22 displays the received search result.

The server 10 has a database 11 for managing attribute information of devices on the network 40 and functions as a directory server. Identification information and various attribute information of each device on the network are stored in the database 11.

A search module 12 searches a device satisfying a desired condition from the database 11 in accordance with the device search condition received from the client 20 and transmits the search result to the client. A device attribute registration module 31 receives the device attribute from the device 30 and registers it in the database 11.

The device 30 has a function of providing the client 20 with various services, and may be a scanner, a printer, a facsimile or the like. The device attribute transmission module 31 transmits its attribute information to the server 10 and requests the server 10 to register it.

An example shown in FIG. 1 provides the minimum unit of the structure of the device search system. In practice, a plurality of clients and devices are connected to the network. The device search system may have a plurality of servers.

Figure 2:
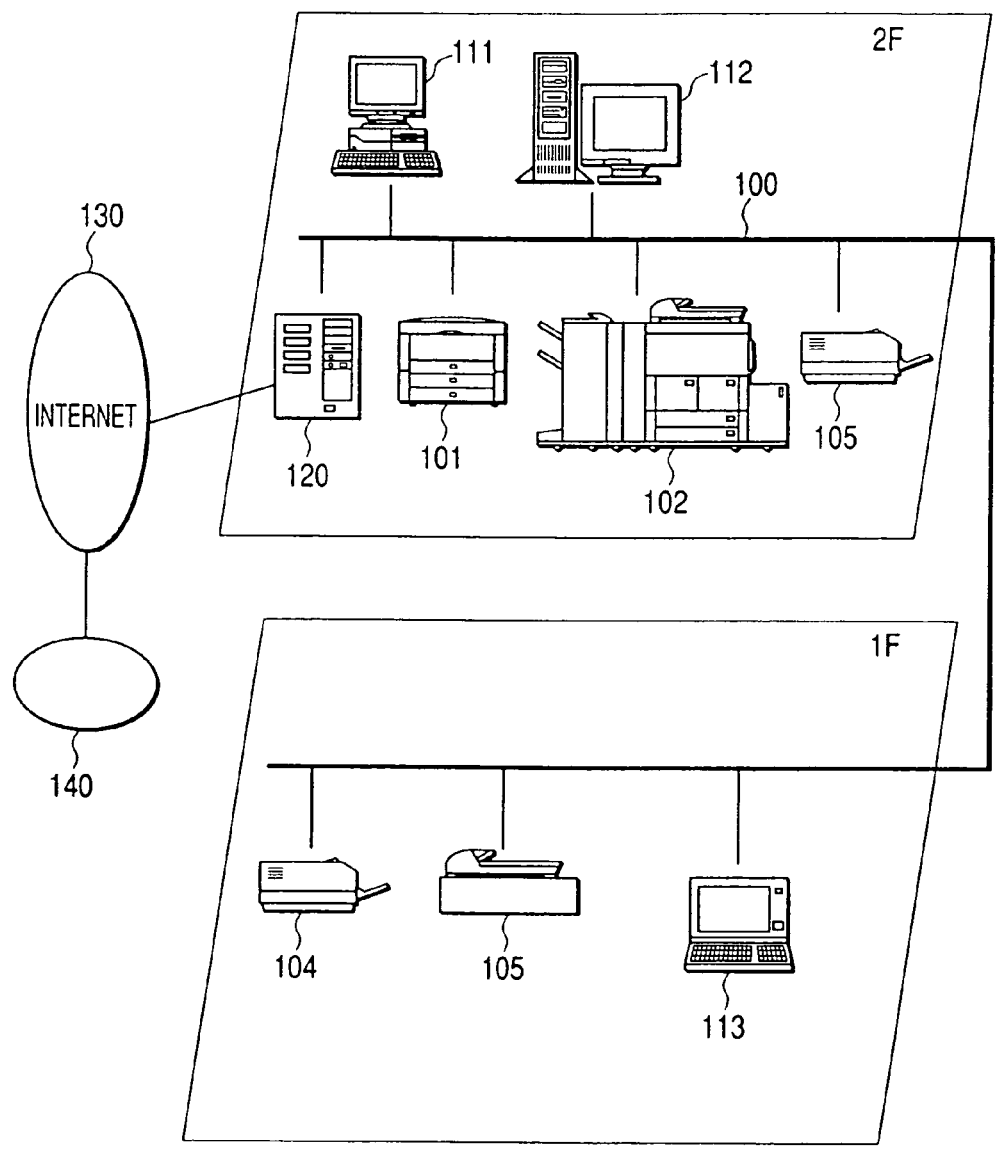
FIG. 2 is a diagram showing the structure of a network on which a device search system of an embodiment runs.

FIG. 2 is a diagram showing the specific structure of a network on which the device search system of the embodiment runs.

In FIG. 2, reference numeral 101 represents a color printer, reference numeral 102 represents an MFP (Multi Function Peripheral) which is a copier capable of being used also as a network color printer, a scanner, and a facsimile, reference numerals 103 and 104 represent a monochrome printer, and reference numeral 105 represents a scanner. These are all connected to the network.

Reference numerals 111 and 113 represent a desk top PC and a note PC. These PCs can execute programs of network clients. The desk top PC 111 and note PC 113 are connected to the network as client terminals, and have the functions of issuing inquiry information on a device satisfying a desired condition to the server connected to the network and displaying the search result, as will be later described.

Reference numeral 112 represents a work station WS capable of executing a program of the network server of the embodiment. The work station WS 112 is connected to the network as the server, stores various information on the network devices 101 and 105 as will be later described, and receives a device search inquiry from the client 111 or 113 connected to the network to return the search result.

Of these devices, the color printer 101, MFP copier 102, monochrome printer 103, client 111, server 112 and a fire wall 120 are installed on the second floor 2F, whereas the monochrome printer 104 and scanner 105 are installed on the first floor 1F. The note PC 113 installed on the first floor and connected to a LAN 100 may be removably used.

The network 100 interconnecting these devices is connected via the fire wall 120 to the Internet 130 and to another network 140.

Figure 3:
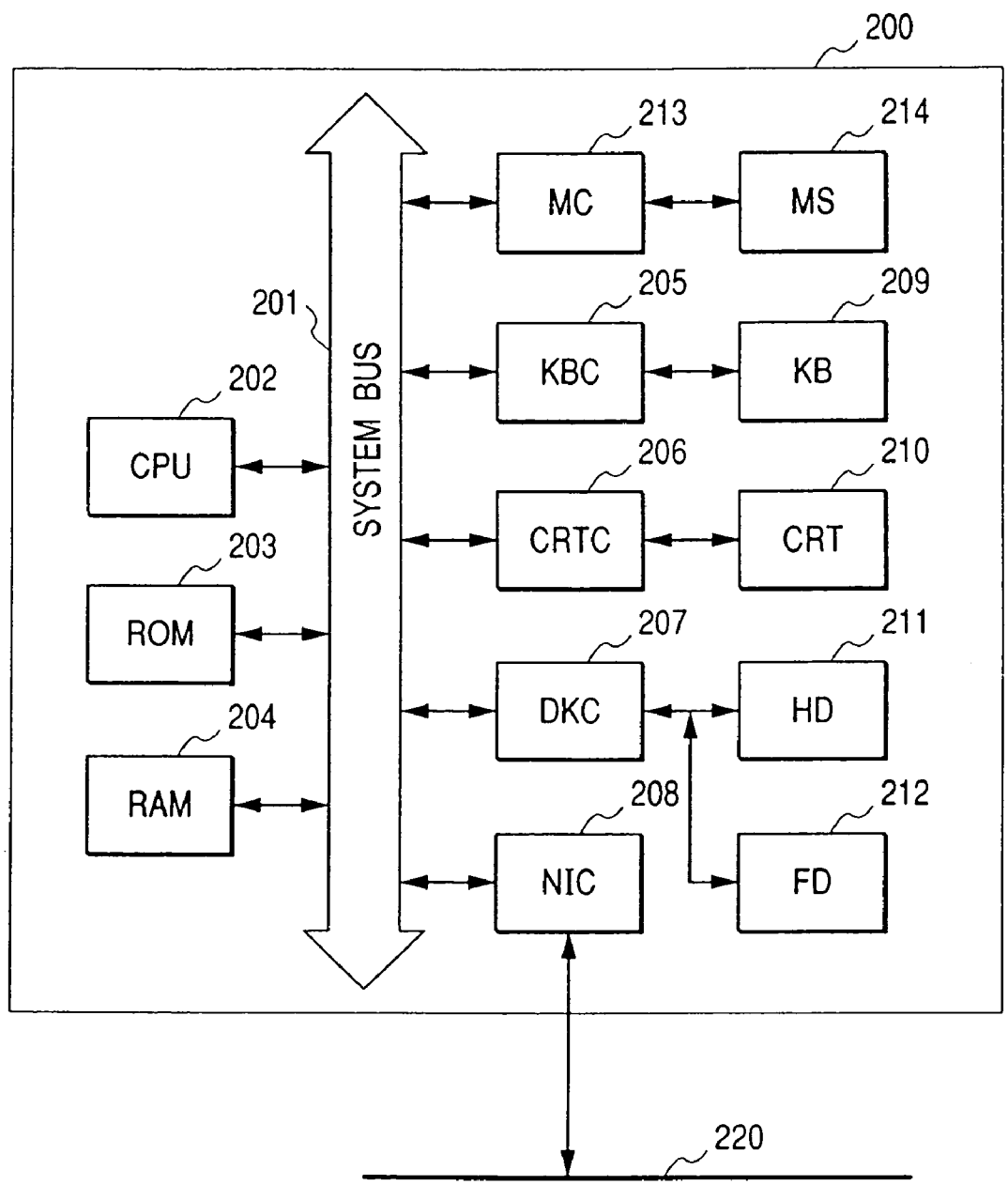
FIG. 3 is a diagram showing the internal structure of a general personal computer.

FIG. 3 is a schematic diagram showing the internal structure of a general personal computer. The fundamental internal structure of the desk top PC 111, note PC 113, server 112 or the like is the same as that shown in FIG. 3.

In FIG. 3, reference numeral 200 represents a PC which executes client software and work server software (collectively called network device search software) and corresponds to the client 111, server 112 and note PC 113 shown in FIG. 2.

PC 200 has a CPU 202 which executes the network device search software stored in a hard disk (HD) 211 or a floppy disk (FD) 212. PC 200 collectively controls each device connected to a system bus 201.

Reference numeral 204 represents a RAM which functions as a main memory, work memory or the like of CPU 202. Reference numeral 205 represents a keyboard controller (KBC) which controls inputs from a keyboard (KB) 209. Reference numeral 206 represents a CRT controller (CRTC) which controls a CRT display (CRT) 210.

Reference numeral 207 represents a disk controller (DKC) which controls access to the hard disk (HD) 211 and floppy disk (FD) 212 storing a boot program, various application programs, edition files, user files, network management programs and the like.

Reference numeral 208 represents a network interface card (NIC) which transfers data to and from the network printer, another network device or another PC via LAN 220.

Reference numeral 213 represents a mouse controller (MC) which controls a mouse (MS) 214. In this embodiment, LAN 220 corresponds to LAN 100 shown in FIG. 2.

Next, hierarchical location information representative of a location of each device on the network will be described.

Figure 4:
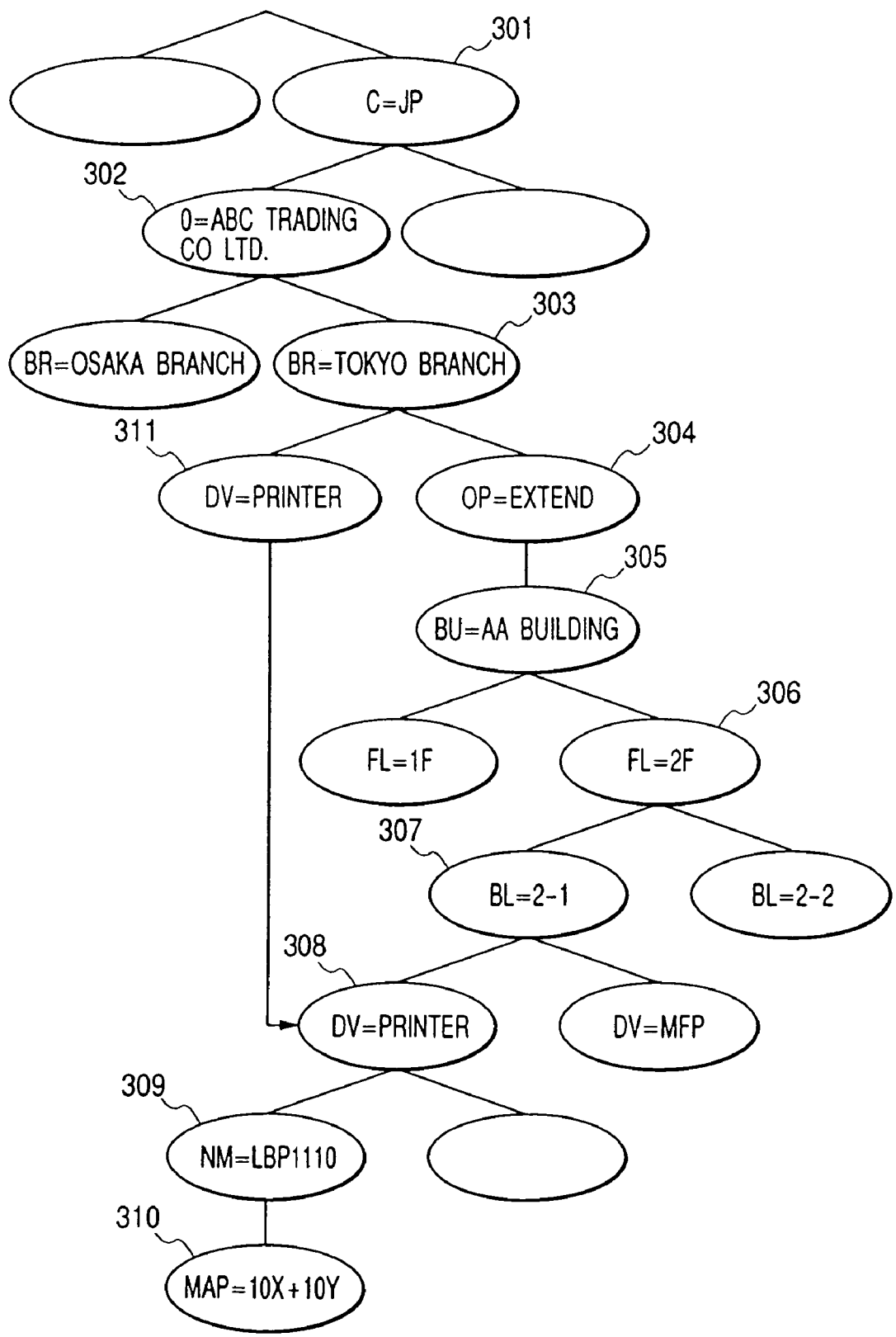
FIG. 4 is a diagram showing an example of hierarchical location information.

As shown in FIG. 4, the data structure of hierarchical location information is hierarchical so that detailed location information can be identified from the upper hierarchical layer to lower hierarchical layer. A user designates a desired hierarchical level in accordance with a use object.

In the example shown in FIG. 4, the hierarchical location information of LBP1110 indicated by reference numeral 309 is designated by (C=JP (301), O=ABC trading Co. Ltd. (302), BR=Tokyo branch (303), OP=extend (304), BU=AA building (305), FL=2F (306), BL=2-1 (307), DV=printer (308)). In this case, a map (310) is represented by "10X+ 10Y".

Each entry will be described. "C" indicates country information (JP is Japan, US is America, etc.). "O" indicates organization information (ABC trading Co. Ltd., XYZ trading Co. Ltd., etc.). "BR" indicates branch information such as a branch shop and a branch office (Tokyo branch, Osaka branch, etc., hereinafter called branch information).

"BU" indicates building information (AA building, BB building, etc.). "FL" indicates floor information (1F, 2F, etc.). "BL" indicates block information of a block on each floor (1-1, 2-1, etc.). "DV" indicates device information (printer, MFP, etc.). "NM" indicates a device name (LBP1110, LBP3310, etc.).

A layout bit map is prepared for a block hierarchical level "BL", the layout bit map including image data for visually displaying the layout. The coordinate information of the layout bit map is indicated by the map 310 shown in FIG. 4.

"OP" shown in FIG. 4 indicates option information representative of the extended information of "BU", "FL" and "BL" hierarchical levels.

The option information may be set to another hierarchical level or it may be omitted from the data structure.

As described earlier, the main object of the invention is to hierarchically manage location information of devices connected to a network, identify the location of the device requested to search in a hierarchical structure, and display the identified device location for the user in a way easy to recognize.

FIGS. 5 to 8 show examples of a layout bit map corresponding to each block hierarchical level of the hierarchical location information. This layout bit map is displayed at the client 111 to display the location of a device in a way easy to recognize.

Figure 5:
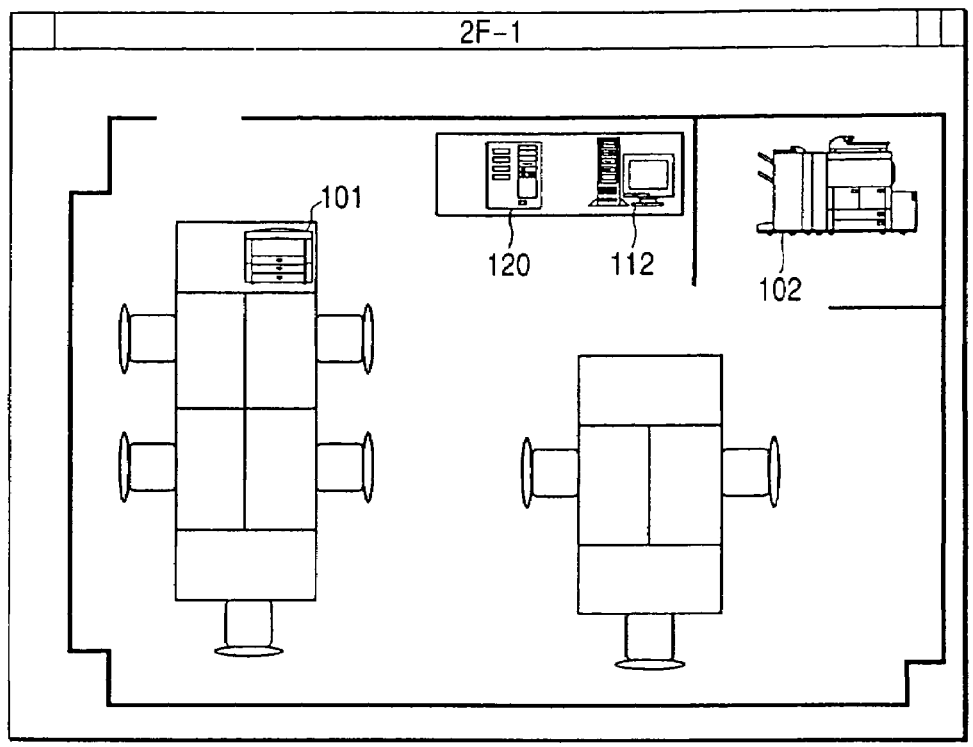
FIG. 5 is a diagram showing the location of each device in a block 2-1 at 2F.

FIG. 5 shows an example of a layout bit map corresponding to a block 2-1 on 2F. In this embodiment, the client 20 has this layout bit map. The layout of desks, partitions and the like on the floor is held as a bit map. On this layout, the color printer 101, MFP 102, fire wall 120 and server 112 are disposed as shown in FIG. 5.

Figure 6:
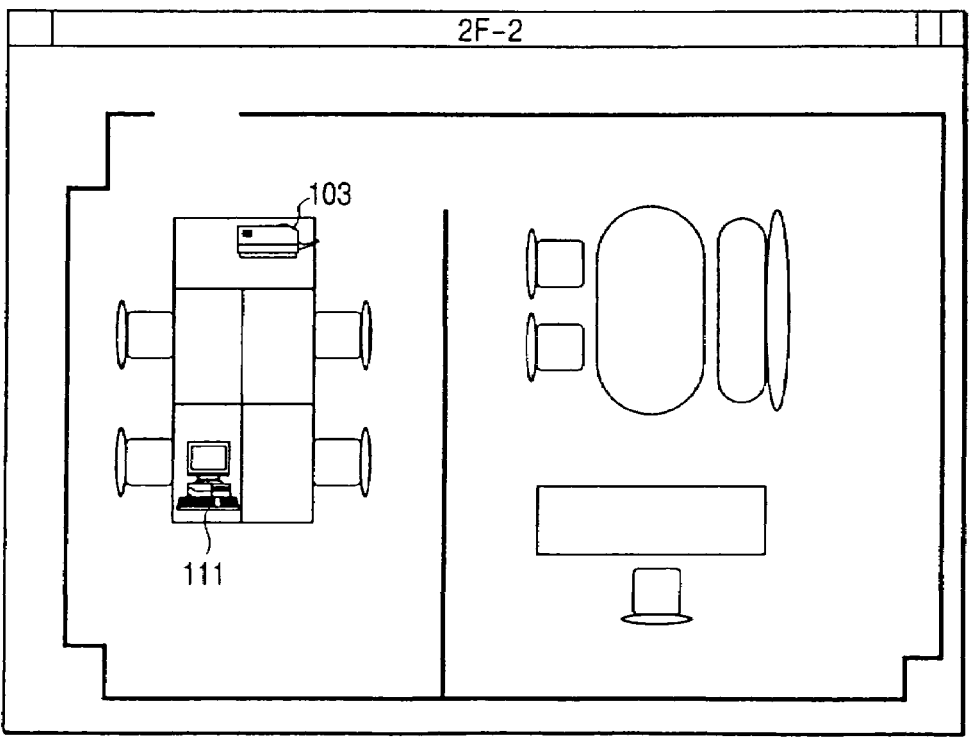
FIG. 6 is a diagram showing the location of each device in a block 2-2 at 2F.

FIG. 6 shows an example of a layout bit map corresponding to a block 2-2 on 2F. In the block 2-2 on 2F, PC 111 and printer 103 are disposed as shown in FIG. 6.

Figure 7:
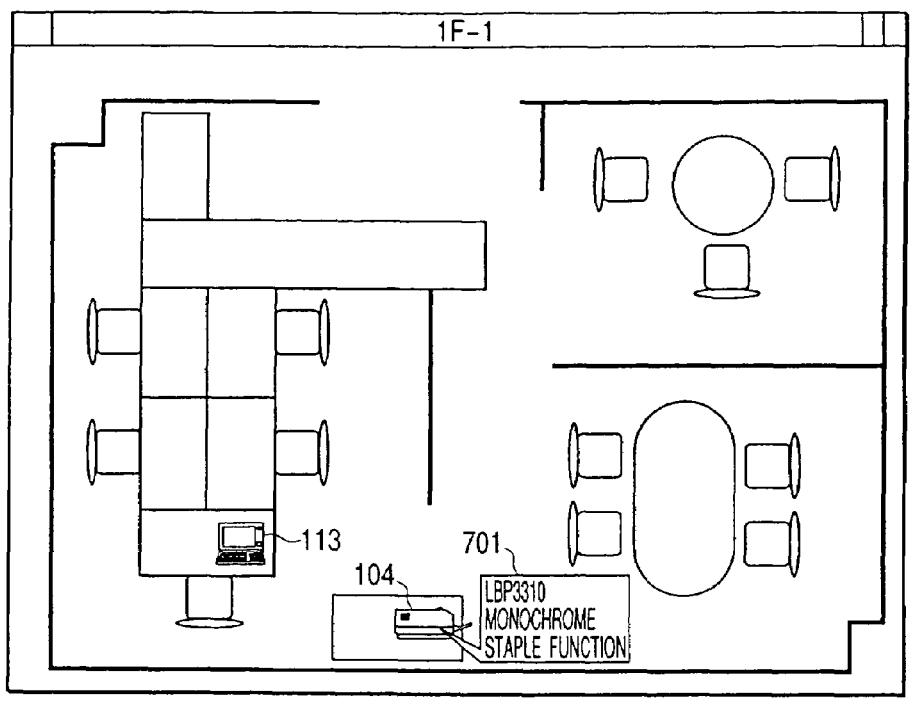
FIG. 7 is a diagram showing the location of each device in a block 1-1 at 1F.

FIG. 7 shows an example of a layout bit map corresponding to a block 1-1 on 1F. In the block 1-1 on 1F, PC 113 and monochrome printer 104 are disposed as shown in FIG. 7.

Figure 8:
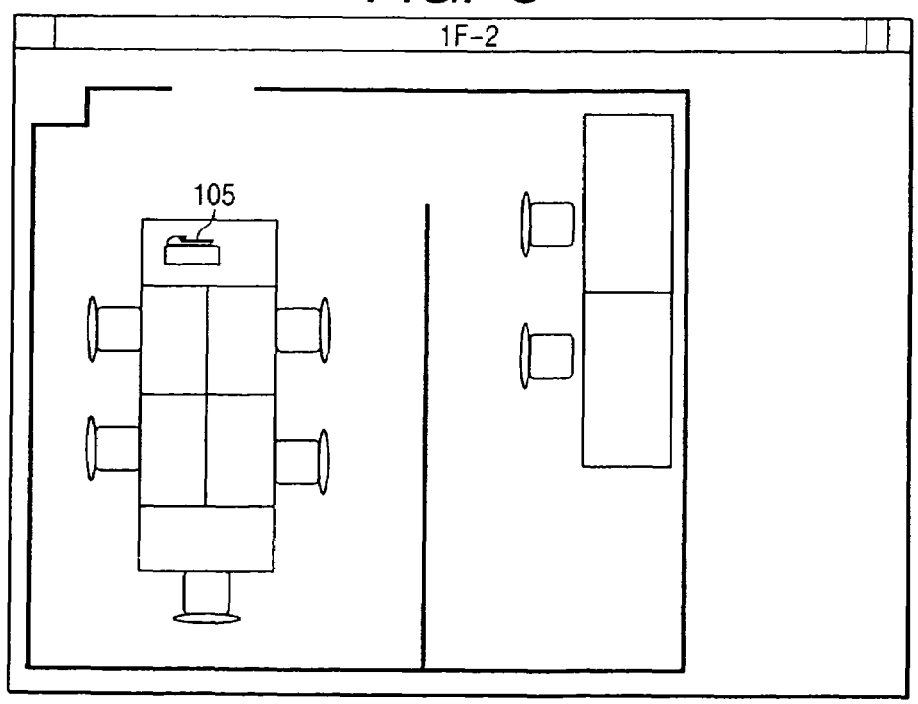
FIG. 8 is a diagram showing the location of each device in a block 1-2 at 1F.

FIG. 8 shows an example of a layout bit map corresponding to a block 1-2 on 1F. In the block 1-2 on 1F, the scanner 105 is disposed as shown in FIG. 8. This scanner is displayed at the client computer of a user as will be later described.

First to third embodiments of a device search system using the hierarchical location information will be described.

First Embodiment

In the first embodiment of the device search system using the hierarchical location information, the layout bit map for visually displaying a device location is stored in the client.

The structure of the server 112 for managing attribute information of each device will be described first.

FIG. 9 shows an example of the structure of a database of the server 112 for managing attribute information of each device on the network.

In FIG. 9, each column corresponds to a set of data registered for each device, i.e., a tuple. Each row corresponds to an attribute for each tuple.

In this database 800 shown in FIG. 9, hierarchical location information is stored at 802 to 810 and other attribute information is stored at 811 to 814, in correspondence to each device.

Examples of the other attribute information include an attribute 811 representative of a presence/absence of a color input/output function, an attribute 812 representative of a presence/absence of a staple function, an attribute 813 representative of a presence/absence of a double-sided print function, and an IP address 814.

This database may be a database management system commonly used in this field, or may be directory information base such as X.500.

FIG. 10 shows an example of the structure of device registration data which is used when the device is registered in the database 800 managed by the server 112.

The device registration data 900 includes location information TAG 901 (902 to 911) set with the device hierarchical location information and device attribute information TAG 912 (913 to 916) set with the device attribute information. After a power is turned on, each device transmits its own device registration data 900 to the server 112.

The transmission operation of the device registration data 900 may be executed when any item in the device registration data 900 is changed, when a device is plugged in to the network, or periodically. The device registration data 900 may be transmitted from the device in response to an inquiry from the server.

Upon reception of the device registration data 900 from a device, the server registers the received device registration data in the database 800.

Figure 11:
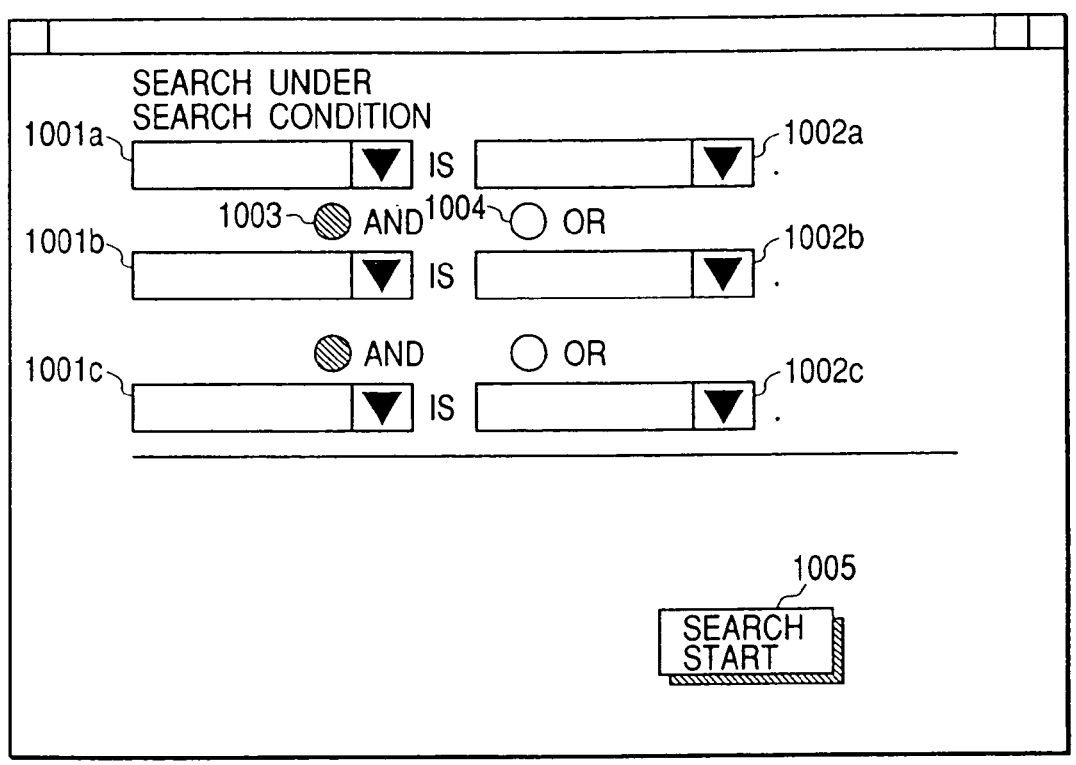
FIG. 11 is a diagram showing an example of a device search input window.
Figure 16:
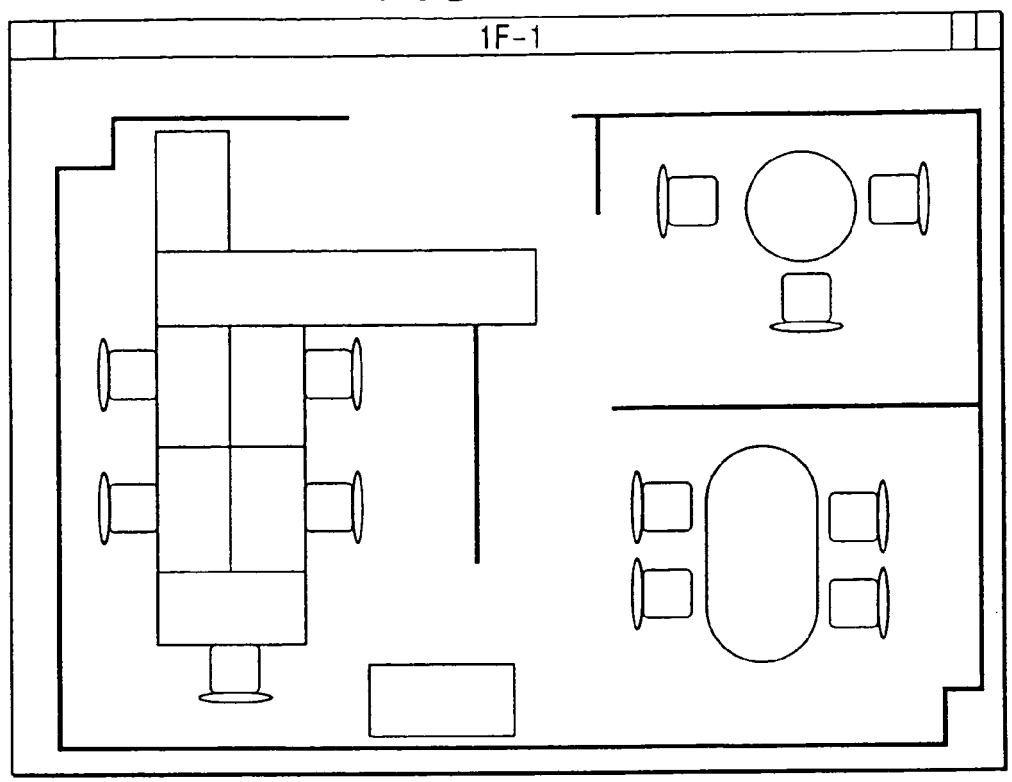
FIG. 16 is a diagram showing a layout bit map managed by the client computer.
Figure 17:
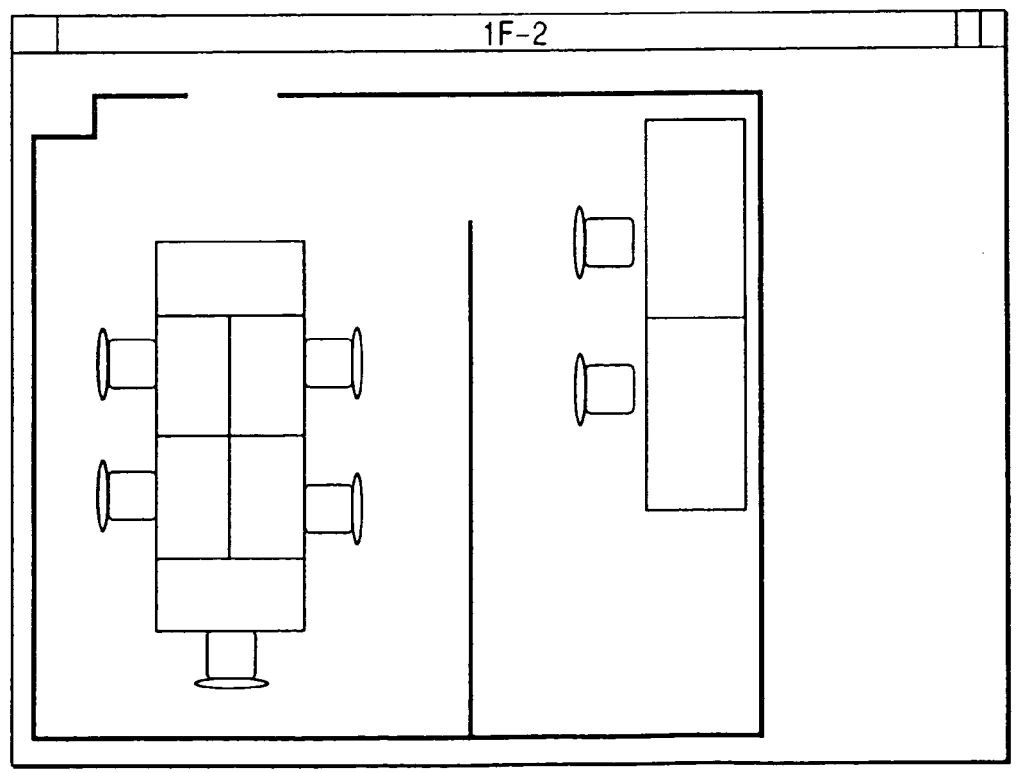
FIG. 17 is a diagram showing a layout bit map managed by the client computer.

FIG. 11 shows a search condition input window to be used for search by the client PC 111. Search entries are input at 1001a to 1001c. In this input window, a pull-down menu can be used to select a desired search condition. Attribute information corresponding to each entry is input at 1002a to 1002c.

For example, if a device is selected as the entry, the pull-down menu of printer, MFP and scanner is displayed as the attribute and a user selects one of them as the search attribute information.

The search condition is entered by using input buttons 1003 and 1004, the input button 1003 entering the search condition AND and the input button 1004 entering the search condition OR. After the user enters the search conditions, a search starts when a search start button 1005 is actuated.

FIG. 12 is a diagram showing an example of a search input. In this example, the attribute information is a printer for with a color print function. If a printer at 2F is to be searched, a "floor" is entered at 1001c and "2F" is entered at 1002c.

If the detailed location of 2F is to be designated for the search, for example a "block" is entered at 1001c and "2-1" is entered at 1002c. A search for "printer at block 2-1" can therefore be executed.

FIG. 13 is a diagram showing an equation of the search conditions described above. In this example, the floor (FL) is the second floor (2F), the device (DV) is the printer (printer), and the color output (color) is possible (TRUE).

It is necessary to describe how the server received the search condition equation shown in FIG. 13 evaluates the equation "FL=2F". The reason is as follows. The location condition of floor=2F is satisfied not only by the device installed on 2F of the AA building of the Tokyo branch desired by the user to be searched, but also by the device installed on 2F of the YY building of the Osaka branch. Therefore, the device of the YY building of the Osaka branch not desired by the user is also searched and the search result unnecessary for the user is given.

In order to avoid this, it is necessary that the server 112 has a scheme of automatically identify the upper hierarchical level than the floor hierarchical level (FL).

One example of this scheme is to make the server store hierarchical location information for the search conditions at the hierarchical level higher than the floor hierarchical level (FL) and use this information. According to this method, when a search request is issued to the server installed at the AA building of the Tokyo branch under the condition of "FL=2F", only the device on 2F of the AA building can be used as the search candidate.

If the device installed on 2F of the YY building of the Osaka branch is desired to be searched, a search request is issued to the server installed on 2F of the YY building of the Osaka branch under the search condition of "FL=2F".

In the example shown in FIG. 12, although a specific hierarchical level is designated, a so-called full-path designation from the highest hierarchical level to a predetermined hierarchical level may also be used.

In this case, the search condition equation shown in FIG. 13 is a full-path designation from the highest hierarchical level "e.g., C=JP, O=ABC, BR=Tokyo branch, . . . ).

With this full-path designation, it is possible to search the device installed on 2F of the YY building of the Osaka branch from the server installed at the AA building of the Tokyo branch.

FIG. 14 shows an example of the search result of the device satisfying the search condition shown in FIG. 13, returned from the server 112 to the client PC 111.

In accordance with the search condition shown in FIG. 13 and received from the client 111, the server 112 searches the database 800 (FIG. 9) and the satisfied device information is returned to the client 111 as the search result 1300.

The search result 1300 includes the hierarchical location information 1301 to 1310 and device attribute information 1311 to 1314. If there are a plurality of devices satisfying the search condition, the search result 1300 includes the hierarchical location information 1301 to 1310 and device attribute information 1311 to 1314, respectively of a plurality of devices.

Since the device satisfying the search condition shown in FIG. 13 is only LBP1110, only the information shown in FIG. 14 is returned to the client 111.

FIG. 15 is a correspondence list between block hierarchical levels of the hierarchical location information and layout bit maps, stored in the client 111.

By using this correspondence list, the client 111 can identify the layout bit map in accordance with the hierarchical location information.

In this embodiment, layout bit maps shown in FIGS. 16 to 19 are stored in correspondence with the blocks 1-1, 1-2, 2-1 and 2-2.

Figure 20:
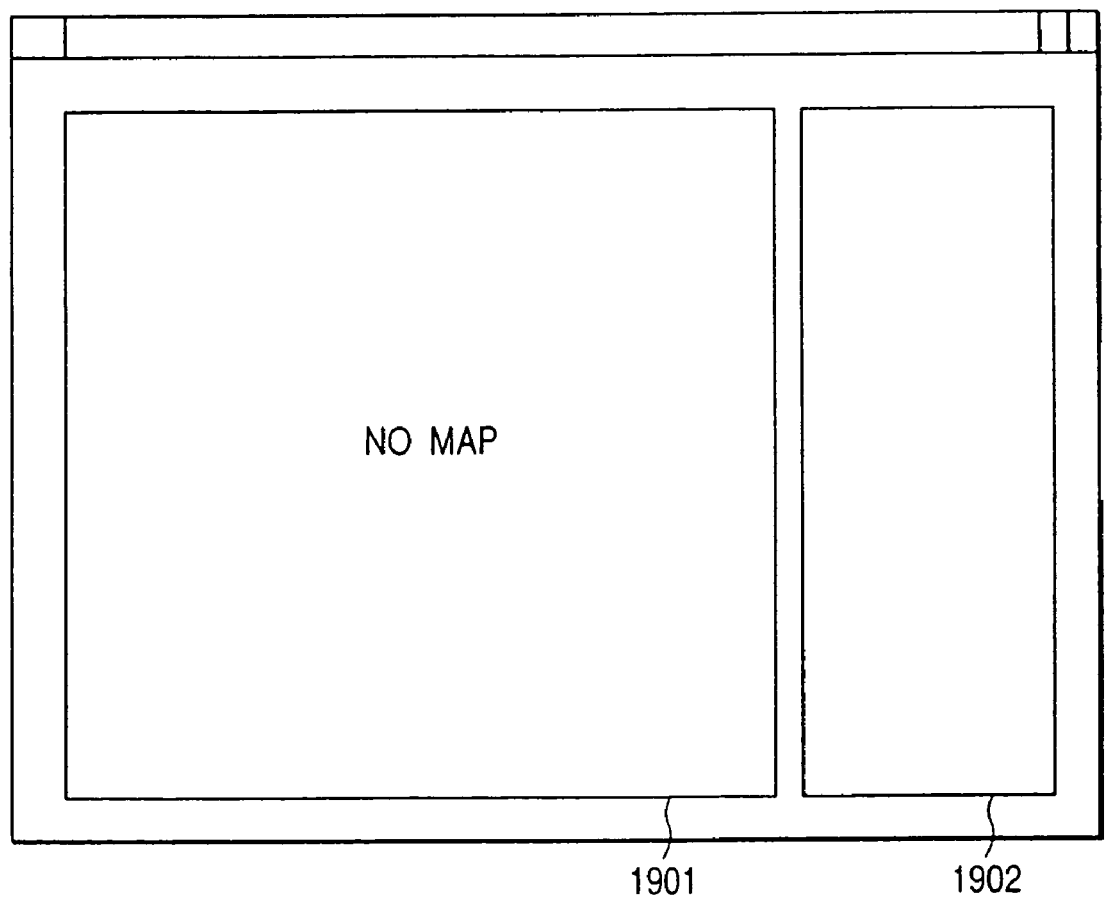
FIG. 20 is a diagram showing a layout bit map managed by the client computer.

For other blocks, the layout bit map shown in FIG. 20 is displayed.

FIGS. 16 to 19 show the layout bit maps at block hierarchical levels. In this embodiment, information representative of the searched device is displayed superposing upon the layout bit map. It is therefore possible to visually confirm the location, block and floor of the search requested device.

FIG. 20 shows the layout bit map (hereinafter called an unknown MAP) which is displayed when the layout bit maps of the client cannot be used. In FIG. 20, in an area 1901 an indication that there is no layout bit map is displayed, and in an area 1902 a device not having the hierarchical location information or not coincident with the hierarchical location information is displayed.

FIG. 21 shows device icons for displaying devices of the client 111.

Each device icon is one-to-one correspondence with each device name (NM), and a device icon representative of a device whose name is not known is also used.

Figure 22:
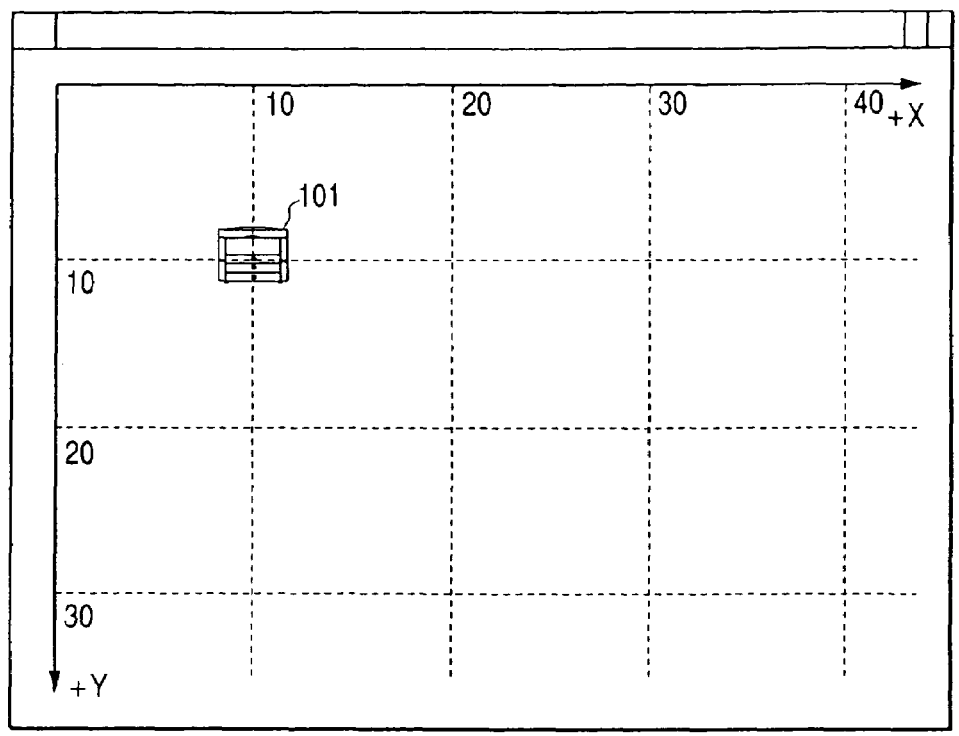
FIG. 22 is a diagram showing the location of a device icon.

FIG. 22 is a diagram illustrating a scheme of displaying a device icon on the layout bit map, to be executed by the client 111.

The client derives the hierarchical location information and device attribute information from the search result acquired from the server 112, and selects the corresponding layout bit map and device icon.

Since the coordinate information for the selected layout bit map can be obtained from the acquired hierarchical location information, the device icon 2002 representative of the color printer 101 (LBP1110) is superposed at the coordinate "10X+10Y" of the selected layout bit map.

By superposing the device icon at the corresponding coordinate of the layout bit map, it is possible to display the location of the search requested device in a manner easy to be recognized by the user.

Figure 23:
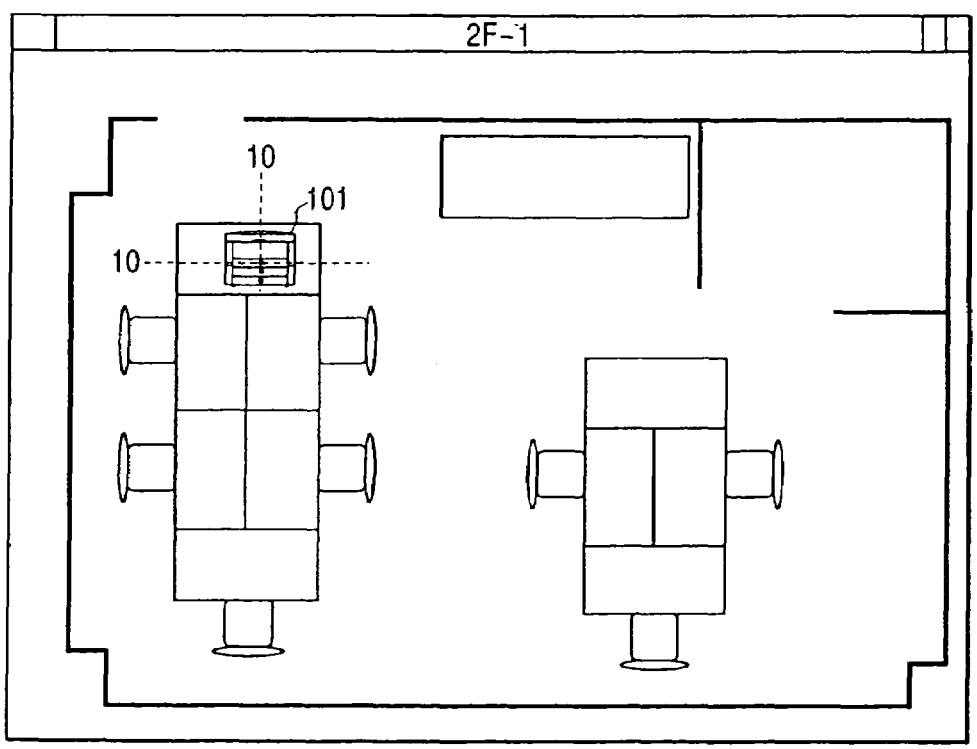
FIG. 23 is a diagram showing device search results.

FIG. 23 shows an example of the bit map displayed on the client 111 after the search. As seen from FIG. 23, it is possible to know that the color printer 101 is at the location of a table near an inlet of the block 2-1 on 2F.

Figure 24:
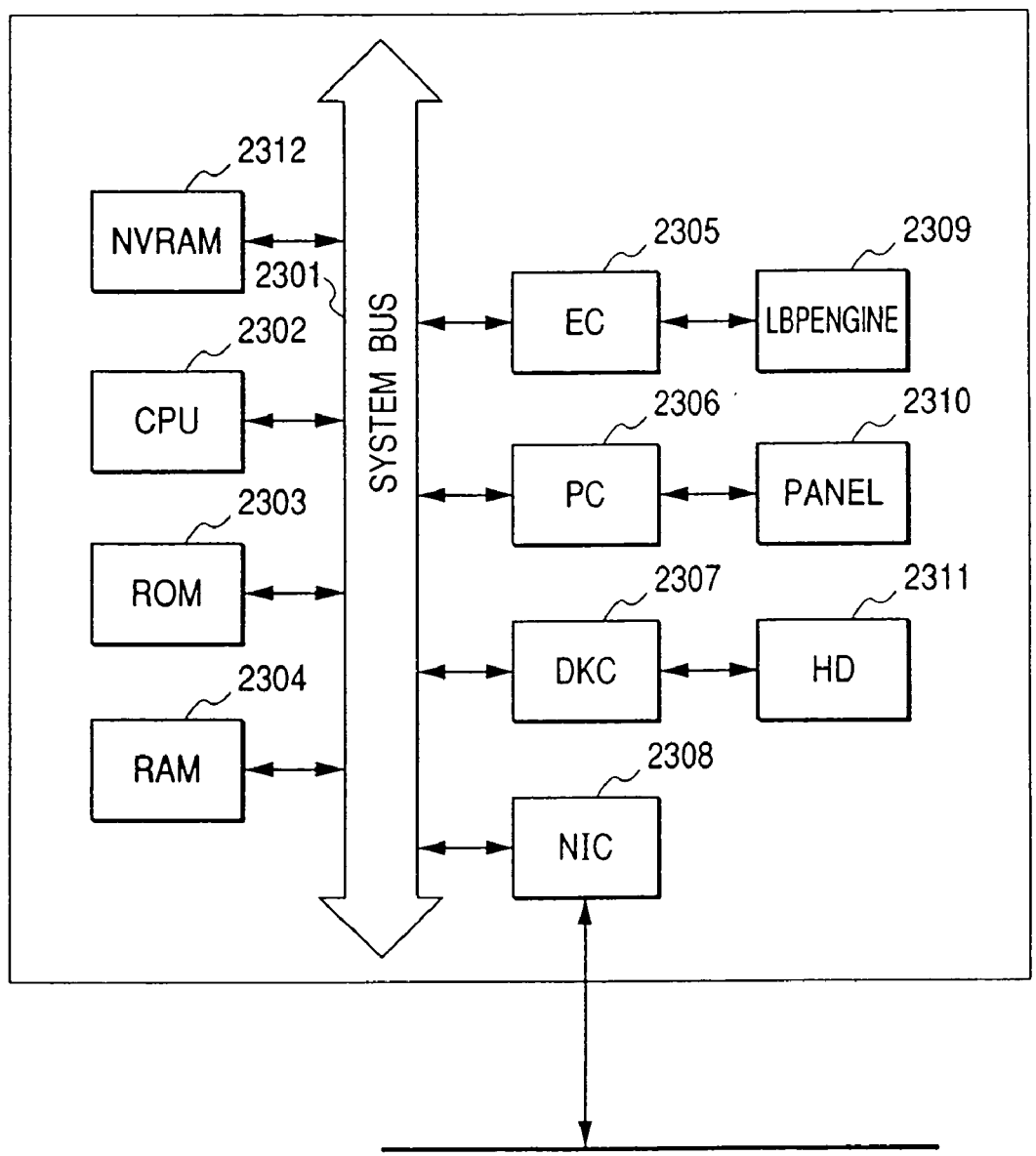
FIG. 24 is a diagram showing the internal structure of a device.

FIG. 24 is a block diagram showing the internal structure of the color LBP 101 of this embodiment. As shown in FIG. 24, connected to a system bus 2301 of this printer 101 are a CPU 2302 for executing a program, a ROM 2303 for storing programs, and a RAM 2304 used as a work area and a buffer area for programs.

Reference numeral 2305 represents an LBP engine controller to which an engine 2309 is connected. Reference numeral 2306 represents a panel controller which manages a panel 2310 by controlling input/output to and from the panel.

The color LBP 101 of this embodiment has a hard disk (HD) 2211 and can temporarily spool print data in this disk. Reference numeral 2307 represents a disk controller which controls HD 2211. Reference numeral 2308 represents a network interface controller to which a network is connected.

Reference numeral 2312 represents a non-volatile RAM (NVRAM) which retains data even while the power of the printer 101 is turned off. In this embodiment, NVRAM stores hierarchical location information, attribute information, and the like. Such information may be stored in HD 2211 instead of NVRAM 2312.

FIGS. 25 to 29 are flow charts illustrating the operation of the embodiment. The details of this embodiment will be given with reference to the flow charts.

With reference to the flow chart shown in FIG. 29, a process of registering device hierarchical location information will be described. The color printer 101 (LBP1110) is used by way of example in the following description.

LBP 101 stores the hierarchical location information and attribute information in the non-volatile RAM 2312 serving as a device location storing means. When a power is turned on, CPU 2302 of LBP 101 establishes a connection to the server 112 (Step S2801). After the connection, LBP 101 reads the hierarchical location information and attribute information from the non-volatile RAM 2312, sends it to the server 112 which registers it in managing means in the format shown in FIG. 10 (Step S2802).

After the registration, CPU 2302 of LBP 101 releases the connection to the server 112 (Step S2803). With these steps, after the power is turned on, each device registers the hierarchical location information and attribute information in the server 112.

Figure 29:
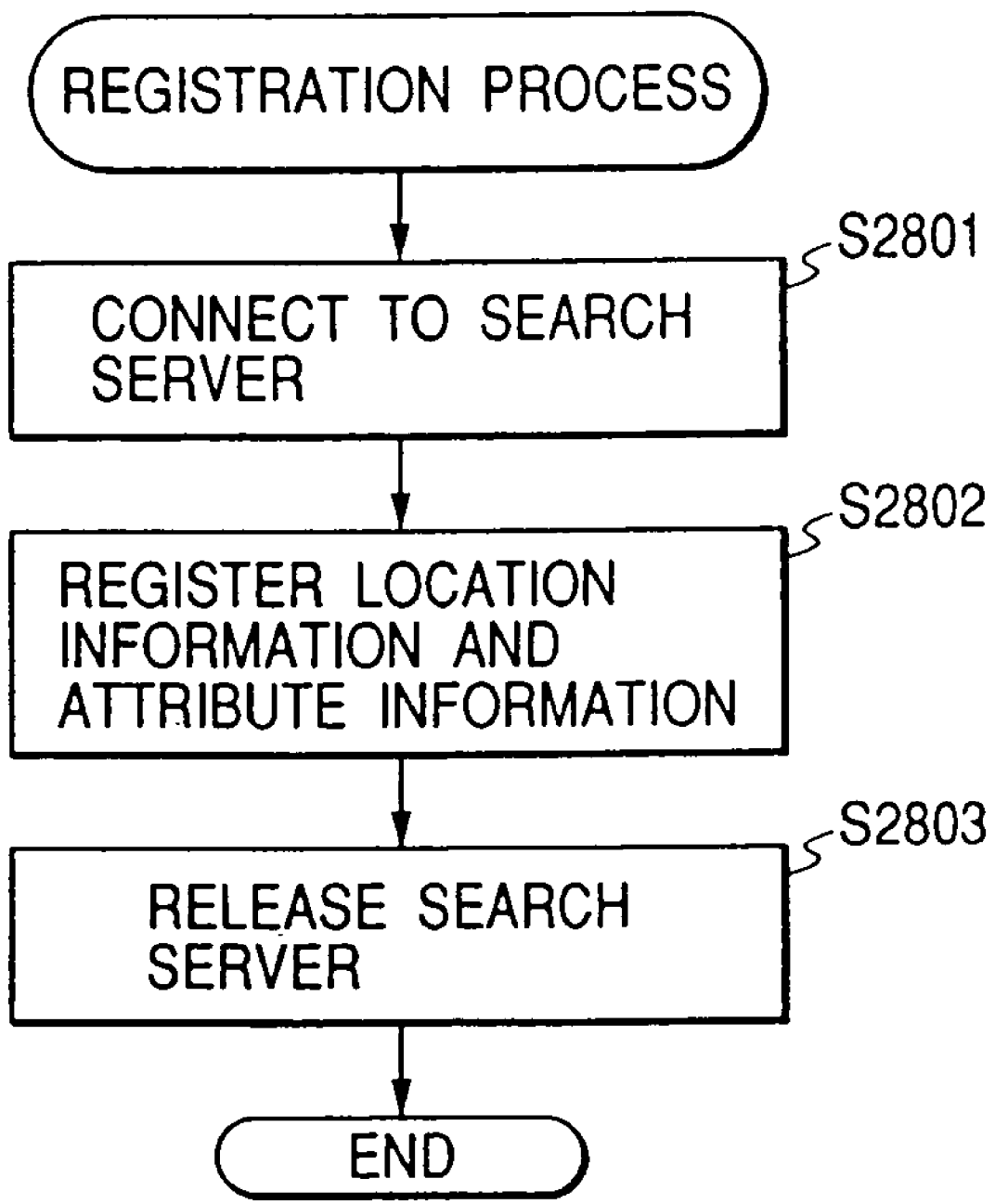
FIG. 29 is a flow chart illustrating a registration process.

Various methods of transmitting the hierarchical location information of each device to another computer may be used in addition to the registration operation in the directory server shown in FIG. 29.

For example, in a network system having no directory server, the hierarchical location information may be set to a response packet which is transmitted in response to a broadcast operation or multicast operation of a device search protocol such as SLP issued from a computer on the network.

Figure 25:
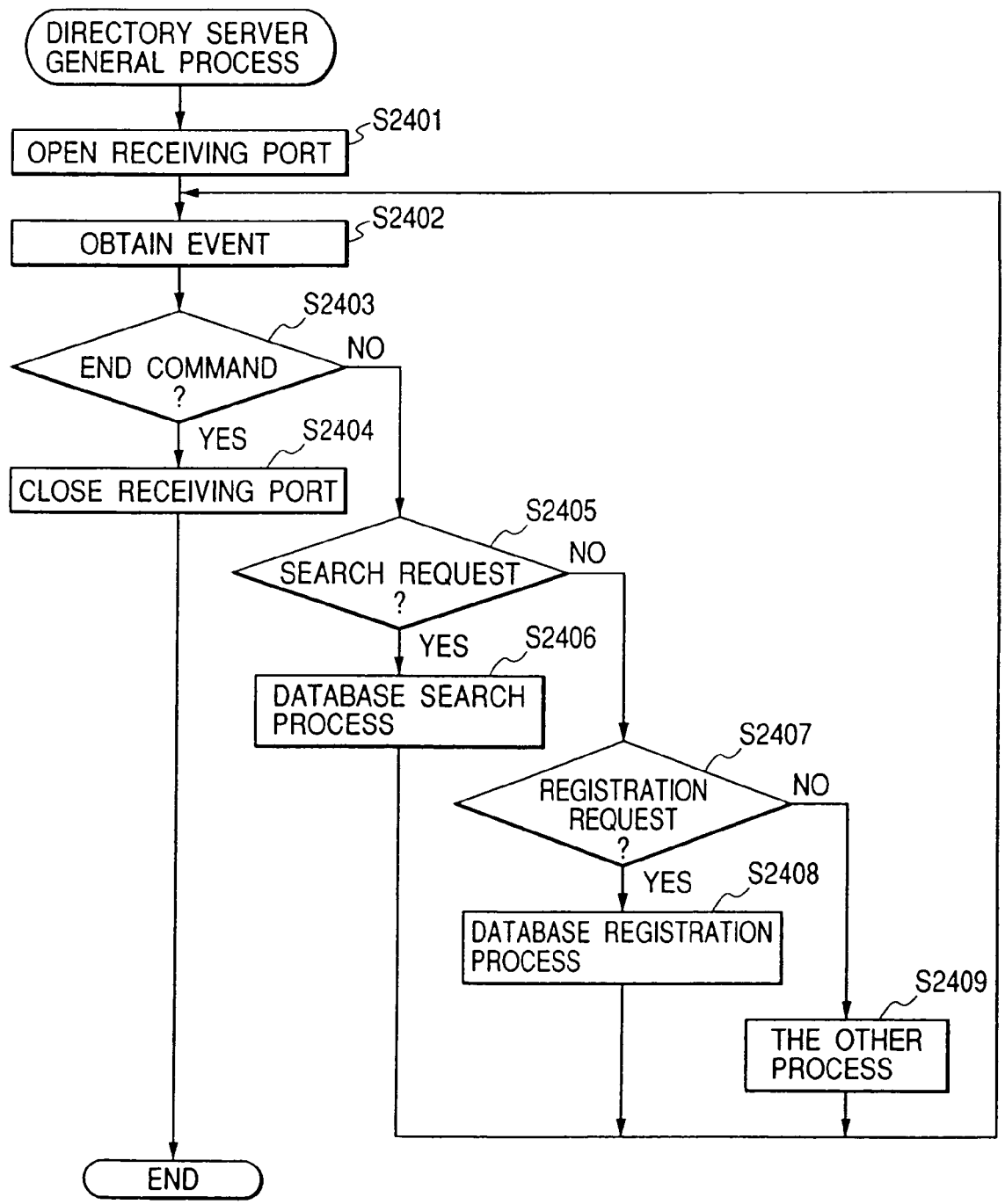
FIG. 25 is a flow chart illustrating the overall operation of a server computer.

Next, with reference to the flow chart of FIG. 25, the operation of the server will be described. The server 112 runs an event driven type program, and when an even occurs, analyzes it and executes a corresponding process.

When a power is turned on, the server 112 first opens a reception port (Step S2401). Next, an event is acquired (Step S2402) and judges whether the acquired event is an end command (Step S2403). If it is judged that the event is the end command, the reception port is closed (Step S2404) to terminate the process.

If it is judged at Step S2403 that the event is not the end command, it is judged whether the event is a search request from the client 111 or the like (Step S2405). In the case of the search request, a database search process is executed at Step S2406.

If it is judged at Step S2405 that the event is not the search request, it is judged at Step S2407 whether the even is a database registration request from the device. If it is judged that the event is the registration request, the received data is registered in the table 800 shown in FIG. 9 (Step S2408).

This registered data is stored in HD 211. If it is judged at Step S2407 that the event is another request, another process is executed (Step S2409).

Figure 26:
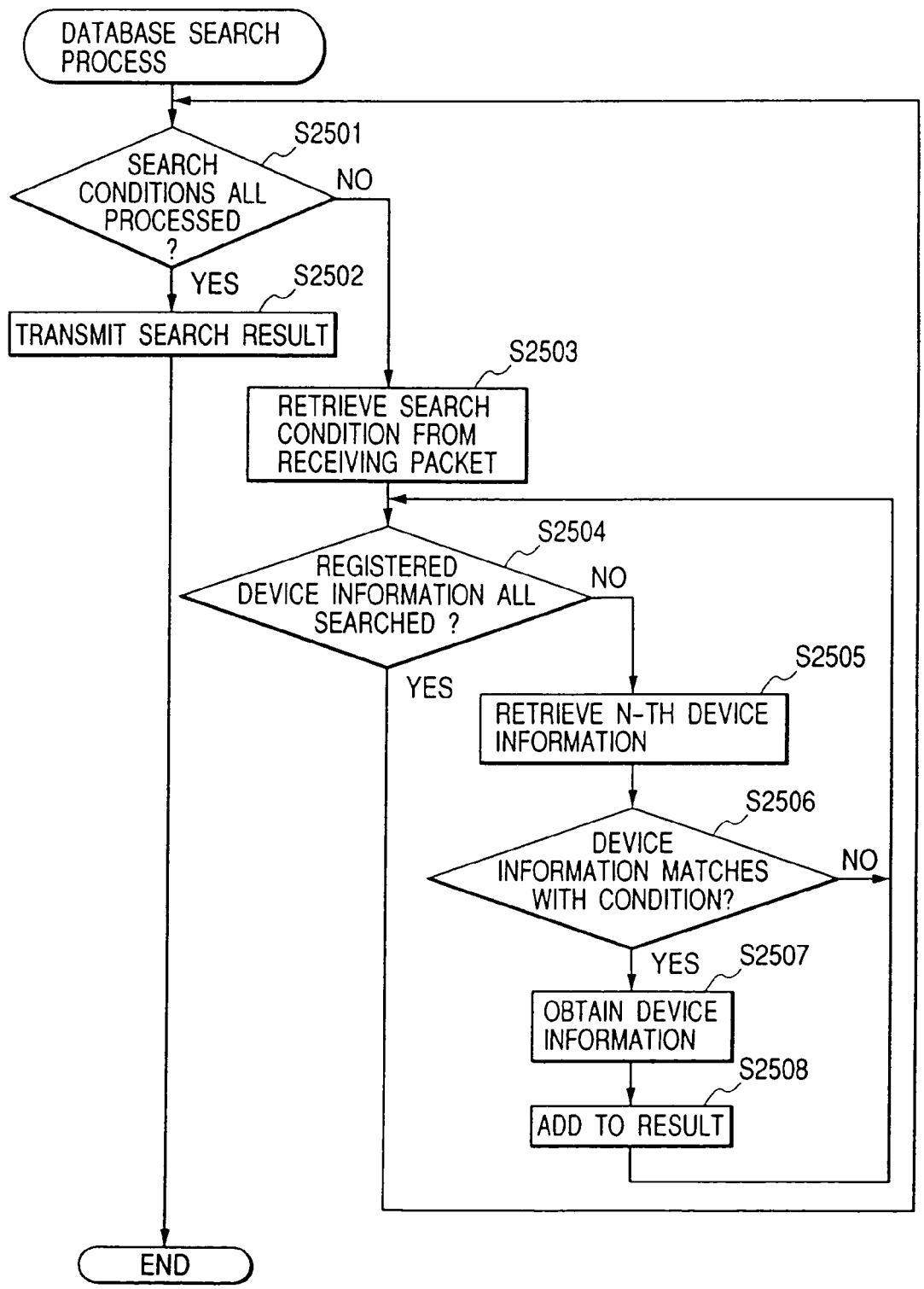
FIG. 26 is a flow chart illustrating a database search process.

Next, with reference to the flow chart shown in FIG. 26, a data search process (process at Step S2406) to be executed by the server will be detailed.

In this search process, it is judged at Step S2501 whether all search conditions have been processed. Until all search conditions have been processed, this search process is repeated.

If all search conditions on a reception packet have been searched at Step S2501, the search result is transmitted to the client (Step S2502).

If all search conditions have not been searched, the flow advances to Step S2503 whereat the next search condition is acquired from the reception packet. It is judged whether all registration device information in the table shown in FIG. 9 has been searched for the acquired search condition (Step S2504).

If it is judged that all registration device information has been searched, the flow returns to Step S2501.

If it is judged at Step S2504 that all registration device information has not been searched, the flow advances to Step S2505 whereat device information of an n-th device is read from HD 211. It is checked whether the read device information satisfies the search condition (Step S2506).

If it is judged that the read device information satisfies the search condition, the device information is acquired (Step S2507) and added to the search result (Step S2508).

If it is judged at Step S2506 that the device information does not satisfy the search condition, the flow returns to Step S2504 for the next device. Devices in the table 800 shown in FIG. 9 are all searched for each search condition, and the search result is transmitted to the client.

Next, the overall operation of the client 111 will be described.

The client 111 runs an event driven type program, and when an even occurs, analyzes it and executes a corresponding process.

Figure 27:
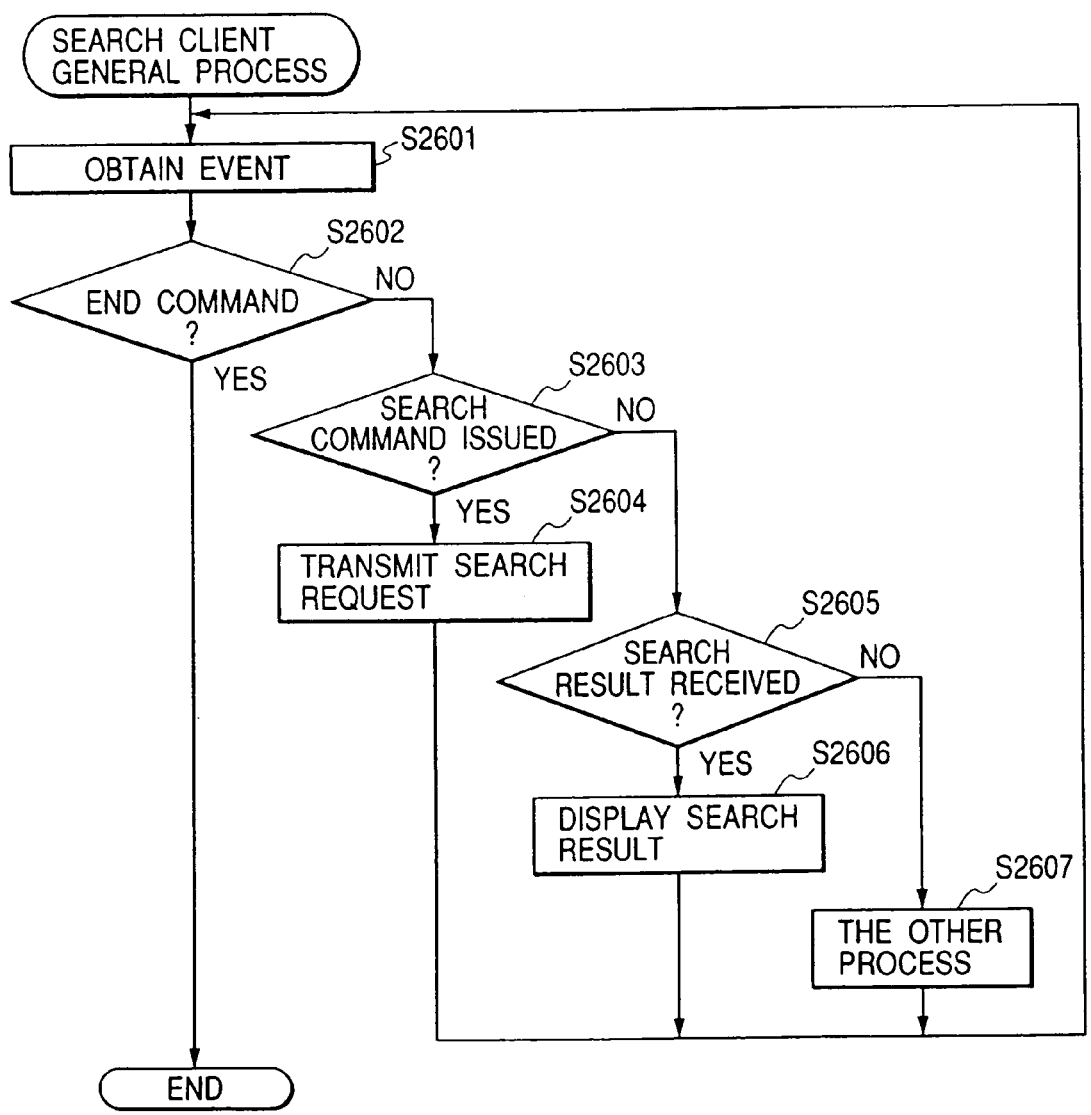
FIG. 27 is a flow chart illustrating the overall operation of a client computer.

As shown in the flow chart of FIG. 27, the client 111 first acquires an event at Step S2601. If the event of the end command is received, the process is terminated (Step S2602).

On the client 111 side, a user enters search conditions from the search condition input window shown in FIG. 11. When the user activates the search start button 1005, an event occurs.

If it is judged at Step S2603 that the event is a request of issuing a search command, the client 111 transmits the search request to the server 112 (Step S2604).

In this case, the search condition equation such as shown in FIGS. 12 and 13 is used to transmit the search request to the server. If this search condition equation is stored in HD 211, this equation can be used when the same search is executed later, to omit the user input of the equation.

The client 111 waits for the search result from the server. It is checked at Step S2605 whether an event of the search result is received. If it is judged at Step S2605 that the search result such as shown in FIG. 14 is received, a search result display process is executed (Step S2606). If another event is received, a corresponding process is executed (Step S2607).

Figure 28:
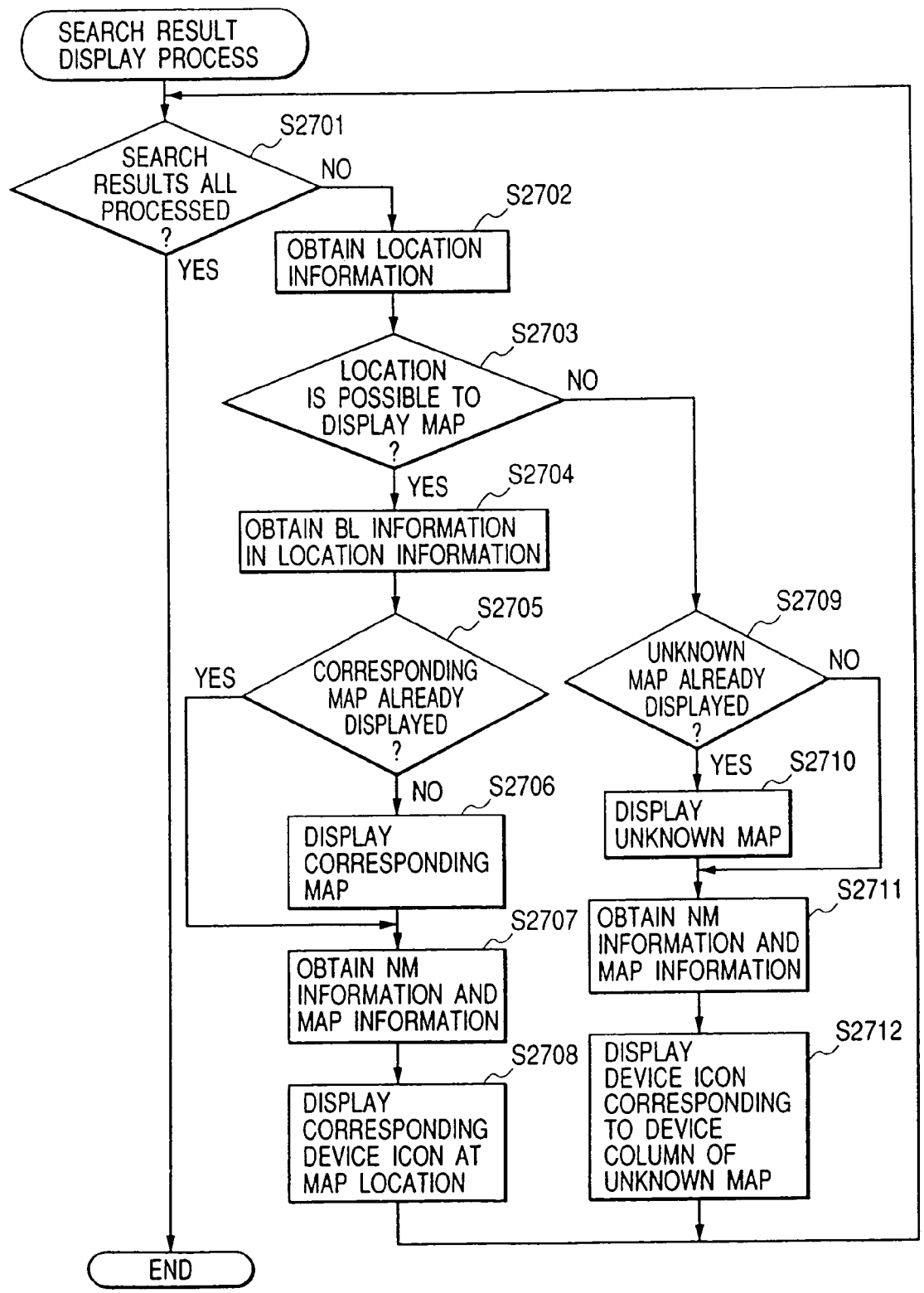
FIG. 28 is a flow chart illustrating a search result display process.

Next, with reference to the flow chart shown in FIG. 28, the search result display process will be detailed.

First, at Step S2701, it is judged whether all search results have been processed. If it is judged that all search results have been processed, the process is terminated.

If it is judged at Step S2701 that all search results have not been processed, the flow advances to Step S2702 whereat the hierarchical location information is acquired from the received search result. In accordance with the acquired hierarchical location information, it is judged whether the client can display a layout bit map (Step S2703).

The judgement at Step S2703 that the layout bit map can be displayed or not means the device information received as the search results contains the hierarchical location information shown in FIG. 4 or not. If not contained, it means that the device hierarchical location information is not registered in the server 112.

In this embodiment, the device hierarchical location information capable of being displayed contains the hierarchical location information which includes the information indicated by reference numeral 1401 in FIG. 15. If the hierarchical location information does not include this information, it is confirmed whether an unknown map is already displayed (Step S2709) and the unknown device shown in FIG. 21 is displayed (Step S2710).

The NM information is derived from the hierarchical location information (Step S2711) and the device icon corresponding to the NM information is displayed in the area 1902 shown in FIG. 20. In this case, the device unable to be normally displayed, i.e., the device whose hierarchical location information is still not registered, is displayed in this area.

If it is judged at Step S2703 that the device can be displayed, the BL information is derived from the hierarchical location information (Step S2704). The client displays the necessary layout bit map by referring to the BL information table shown in FIG. 15 by using the BL information as a key.

It is checked whether the corresponding layout bit map is already displayed (Step S2705). If it is judged that the layout bit map is not still displayed, the corresponding bit map is displayed (Step S2706). The NM information and layout bit map is acquired from the hierarchical location information (Step S2707).

If it is judged at Step S2705 that the layout bit map is already displayed, the flow advances to Step S2707. The device icon corresponding to the NM information is read from the table shown in FIG. 21. In accordance with the layout bit map, the display position of the device icon is determined.

With the above Steps, the layout bit map such as shown in FIGS. 5 to 8 is displayed on a display of the client, and the user can know the detailed location of the device.

With Steps S2705 to 2707, if a plurality of devices are found as the search results, the devices are displayed on the same layout bit maps or on different layout bit maps.

Device attribute information other than the location information may be displayed as a tool tip 701 such as shown in FIG. 7, which can be displayed for example by a predetermined operation on the device icon on the layout bit map.

In this embodiment, since the search result shown in FIG. 14 is returned from the server 112, it can be known that NM is LBP1110 and the coordinate is "10X+10Y". Therefore, the client displays the device icon on the device bit map at the position shown in FIG. 22 (Step S2708). This device bit map is superposed upon the layout bit map to display the search result such as shown in FIG. 23.

In this embodiment, although all the layout bit maps are stored in the client, they may be stored in the client and server in a distributed manner.

Second Embodiment

In the second embodiment, layout bit maps for displaying the location of a device are stored in the server. Different points from the first embodiment will be described mainly.

In the first embodiment, the layout bit maps are stored in the client. Therefore, when the search result is displayed at the client, the server is not required to transfer a layout bit map to the client. It is therefore possible to reduce a load of the display process and shorten the display time, and also mitigate traffics of the network system.

In the second embodiment, the layout bit maps are stored in the server. Therefore, map information can be collectively managed by the server, and the client is not required to store the map information. It is therefore possible to make maintenance such as updating easy and reduce a load on memory resources of the client.

Either the first or second embodiment can be adopted in accordance with the load on the network system and the client performance.

In the second embodiment, stored in the hard disk of the server 112 are the layout bit maps shown in FIGS. 16 to 20, correspondence table between the hierarchical location information and layout bit maps shown in FIG. 15, and device icon information shown in FIG. 21.

Figure 43:
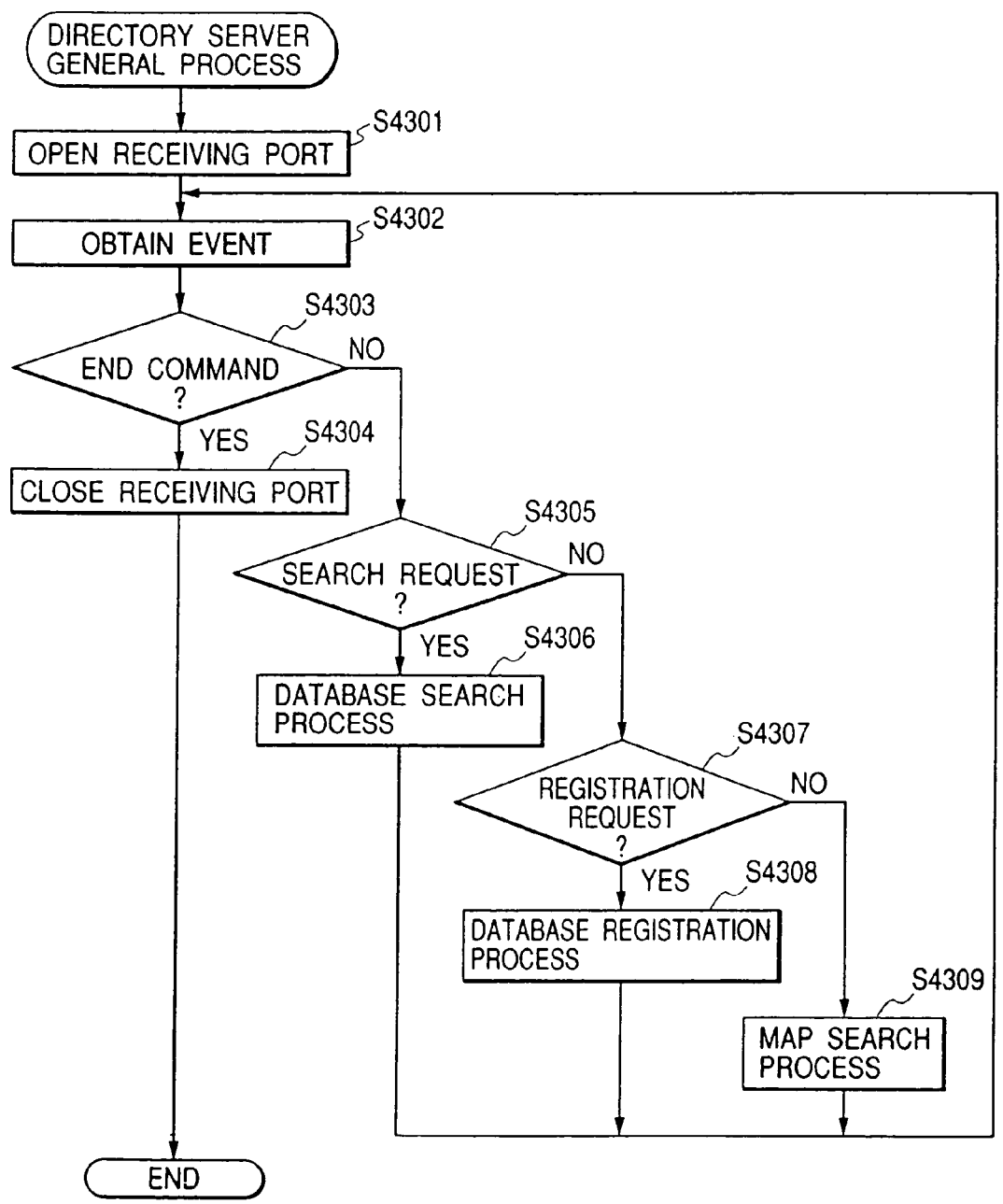
FIG. 43 is a flow chart illustrating the operation of a server computer according to a second embodiment.
Figure 44:
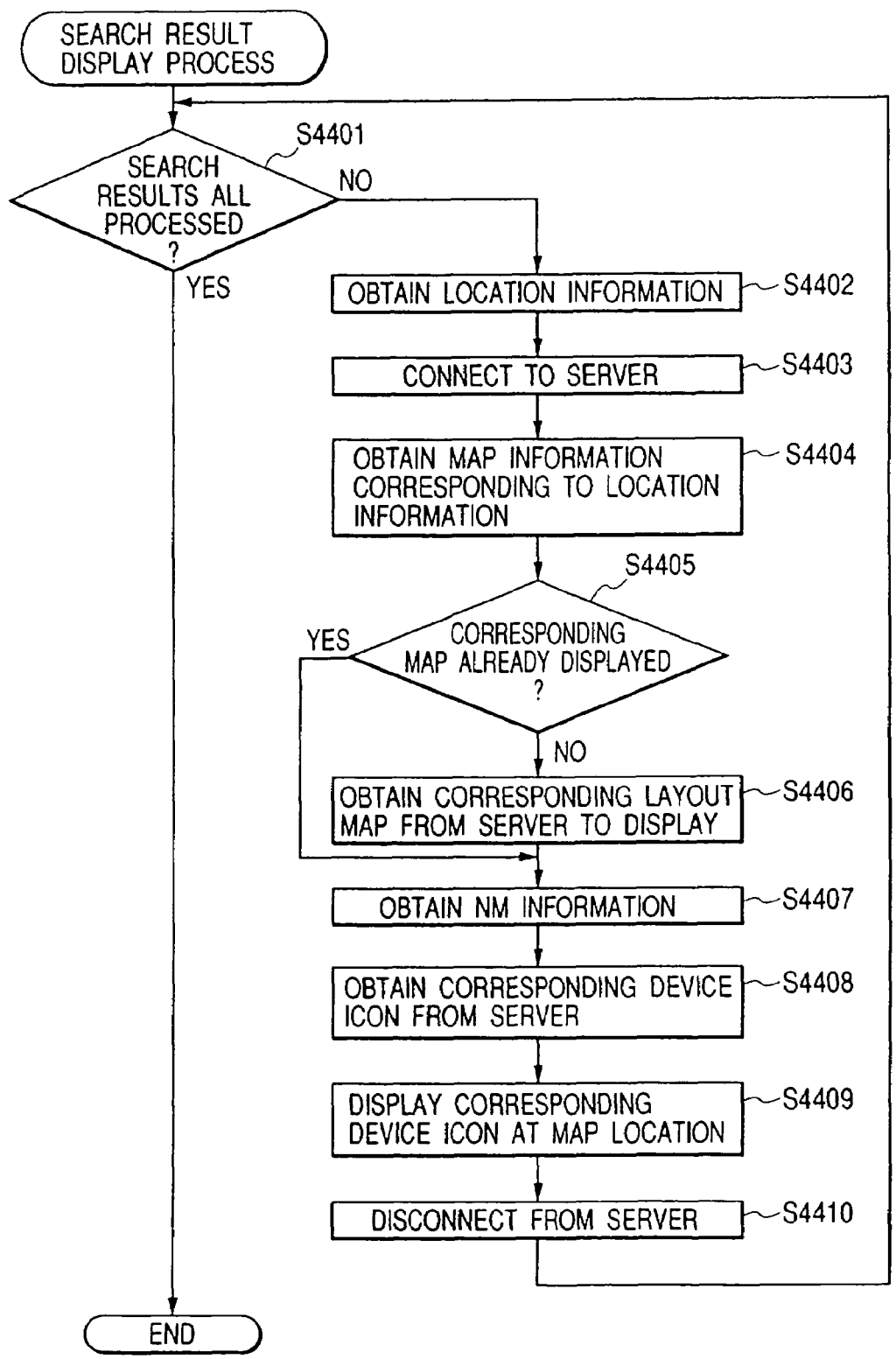
FIG. 44 is a flow chart illustrating the operation of a client computer according to the second embodiment.
Figure 45:
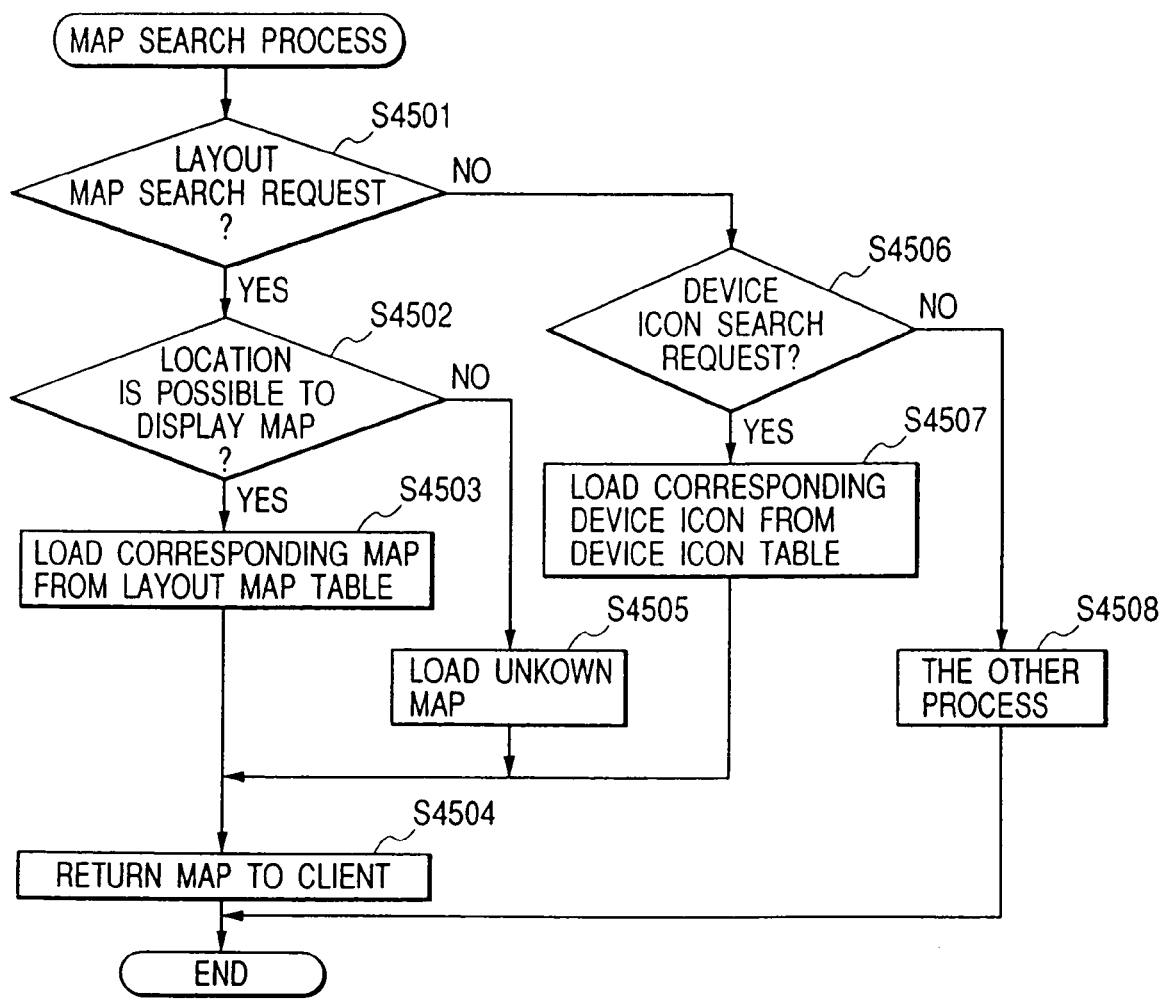
FIG. 45 is a flow chart illustrating the operation of a server computer according to the second embodiment.

Different points from the first embodiment will be described with reference to the flow charts shown in FIGS. 43 to 45.

First, the process to be executed by the server will be described with reference to the flow chart shown in FIG. 43.

The server 112 runs an event driven type program, and when an even occurs, analyzes it and executes a corresponding process.

When a power is turned on, the server 112 first opens a reception port (Step S4301). Next, an event is acquired (Step S4302) and judges whether the acquired event is an end command (Step S4303). If it is judged that the event is the end command, the reception port is closed (Step S4304) to terminate the process.

If it is judged at Step S4303 that the event is not the end command, it is judged whether the event is a search request (Step S4305). In the case of the search request, a database search process is executed at Step S4306.

This search process is executed in accordance with the flow chart shown in FIG. 26 of the first embodiment.

If it is judged at Step S4305 that the event is not the search request, it is judged at Step S4307 whether the even is a database registration request. If it is judged that the event is the registration request, the received data is registered in the table 800 shown in FIG. 9 (Step 4308). This registered data is stored in HD 211. If it is judged at Step S4307 that the event is another request, a search process for the layout bit map is executed (Step S4309). The details thereof will be later given with reference to FIG. 45.

The overall operation of the client is performed in accordance with the flow chart shown in FIG. 27 of the first embodiment. The search result display process at Step S2606 shown in FIG. 27 will be described in detail with reference to the flow chart shown in FIG. 44.

First, at Step S4401, it is judged whether all search results have been processed. If it is judged that all search results have been processed, the process is terminated.

If it is judged at Step S4401 that all search results have not been processed, the hierarchical location information is derived from the received search result at Step S4402. Thereafter, a connection to the server 112 is established (Step S4403) and the layout bit map corresponding to the acquired hierarchical location information is acquired by using the correspondence table shown in FIG. 15 (Step S4404).

It is judged whether the corresponding layout bit map is already displayed (Step S4405). If not displayed, the corresponding layout bit map is acquired from the server (Step S4406). Acquiring the layout bit map is executed in accordance with a designation of the block hierarchical level (BL) by the client 111. The NM information and layout bit map are acquired in accordance with the hierarchical location information (Step S4407). If it is judged at Step S4405 that the layout bit map is already displayed, the flow advances directly to Step S4407.

Next, the corresponding device icon is acquired in accordance with the NM information (Step S4408). The display position of the corresponding device icon on the layout bit map is determined to display it at the predetermined position (Step S2709). After the device icon is displayed, the connection to the server 112 is released (Step 2710).

If the search request pertains to the hierarchical location information not containing the information 1401 shown in FIG. 15, it is judged whether the unknown map is already displayed and thereafter the unknown device map shown in FIG. 20 is displayed.

In this embodiment, since the search result shown in FIG. 14 is returned from the server 112, it can be known that NM is LBP1110 and the coordinate is "10X+10Y". Therefore, the client displays the device icon on the device bit map at the position shown in FIG. 22 (Step S2708). This device bit map is superposed upon the layout bit map to display the search result such as shown in FIG. 23.

Next, with reference to the flow chart shown in FIG. 45, the details of the map information search process (Step S4309 shown in FIG. 43) will be given.

First, at Step S4501 it is judged whether the event is a search request for the layout bit map information. If the event is the map search request, the flow advances to Step S4502 whereat it is judged whether the searched location can be displayed on any map.

If it is judged that the searched location can be displayed, the flow advances to Step S4503 whereat the corresponding map information is acquired by using the correspondence table shown in FIG. 15.

Acquiring the layout bit map is executed in accordance with a designation of the block hierarchical level (BL) by the client 111.

Next, the flow advances to Step S4504 whereat the acquired layout bit map is returned to the client 111. If it is judged at Step S4502 that the searched location cannot be displayed on any map, the flow advances to Step S4505 to acquire the unknown map.

If it is judged at Step S4501 that the event is not the search request for the layout map information, the flow advances to Step S4506 whereat it is judged whether the event is a device icon search request. In the case of the device icon search, the corresponding device icon is acquired at Step S4507 by using the device icon table shown in FIG. 21.

Next, the acquired device icon is returned to the client 111 (Step S4504). If it is judged at Step S4506 that the event is not the device icon search request, another process is executed (Step S4508).

In this embodiment, the server 112 transmits the layout bit map and device icon corresponding to the search result to the client 111, and the client 111 synthesizes the received layout bit map and device icon in accordance with the coordinate information (Step S2708 shown in FIG. 28).

Instead, the server 112 may synthesize the layout bit map and device icon corresponding to the search result, and transmit the synthesized layout bit map together with the search result to the client 111. In this case, the client 111 is not required to execute the map synthesis process (Step S2708 shown in FIG. 28), but it displays the layout bit map itself received from the server 112. A load of the client can be reduced.

Third Embodiment

Next, another embodiment of the device search using the hierarchical location information will be described. In the first and second embodiments, as shown in FIG. 15, five layout bit maps are used including block bit maps (1-1, 1-2, 2-1, 2-2) and an unknown bit map. In this embodiment, layout bit maps at each hierarchical level are also provided and the display method at the client will be described. This embodiment method is inclusive of the first and second display methods at the client described earlier.

In the first and second embodiments, only the layout bit maps corresponding to the block (BL) hierarchical level are stored. In the third embodiment, the layout bit maps corresponding to each hierarchical level of the hierarchical location information are stored and reflected upon the search result display at the client 111.

In the third embodiment, the searched device can be displayed on a layout bit map at the hierarchical level desired by a user, including the location information from rough location information at a building level to detailed location information at one block on one floor.

In the third embodiment, although the layout bit maps are stored in the client 111 similar to the first embodiment, the layout bit maps may be stored in the server 112 similar to the second embodiment.

FIG. 31 is a list of layout bit maps corresponding to each hierarchical level to be searched, this list storing a correspondence between a layout bit map and a hierarchical level of the hierarchical location information.

In the example shown in FIG. 31, the correspondence table stores the information that "the hierarchical level "organization information=ABC trading Co. Ltd. (3101)" corresponds to the layout bit map shown in FIG. 33, "the hierarchical level "organization information=ABC trading Co. Ltd., branch information=Tokyo branch (3102, . . . )" corresponds to the layout bit map shown in FIG. 35, and the like.

By using the layout bit map corresponding to each hierarchical level, it is possible to display the search result in accordance with "the present location of a user", "the degree of location information recognized by a user" and the like.

For example, when a device in the AA building is searched, the layout bit map corresponding to the floor information (FL) at the hierarchical level one level lower than the building information (BU=AA building) is used for the search result display.

Effective location information can therefore be supplied to a user who recognizes the AA building but does not know the information of the inside of the AA building.

In this case, the user selects the building name (BU) from the pull-down menu at 1001c in the input window shown in FIG. 11, inputs the AA building as its attribute value 1002c, and thereafter activates the search start button 1005.

Figure 32:
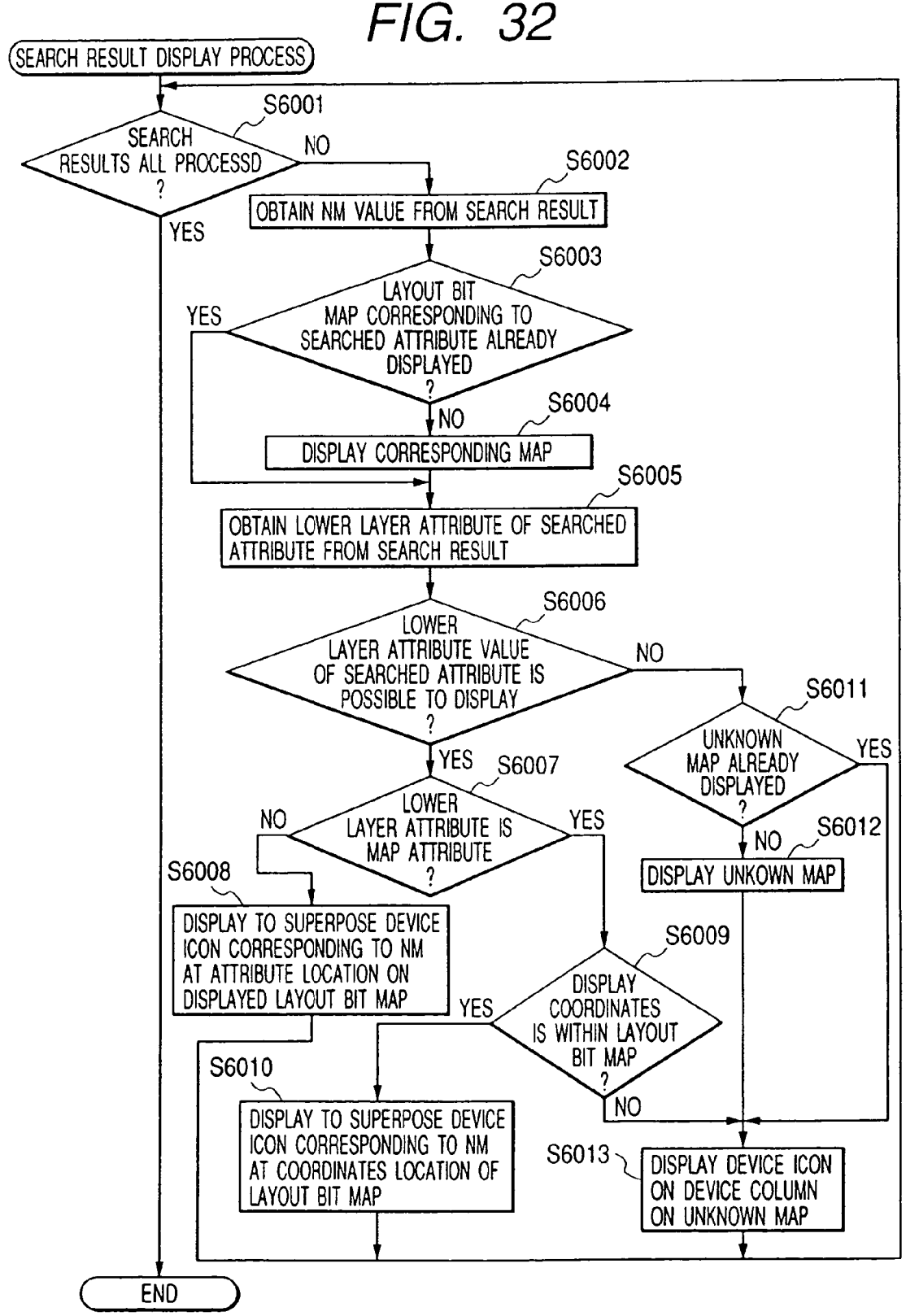
FIG. 32 is a flow chart illustrating a process of displaying a device icon on a layout bit map in accordance with the search results acquired from a server, this process being executed by a client.

Next, the search result display process by the client 111 according to the third embodiment will be described with reference to the flow chart shown in FIG. 32.

First, at Step S6001, it is judged whether all search results have been processed. This Step judges an end of the search result display process.

If it is judged at Step S6001 that all search results have not been processed, the attribute NM is derived from the next search result at Step S6002. This Step is executed so that the device icon can be displayed at Step S6008, S6010 or S6013.

Figure 33:
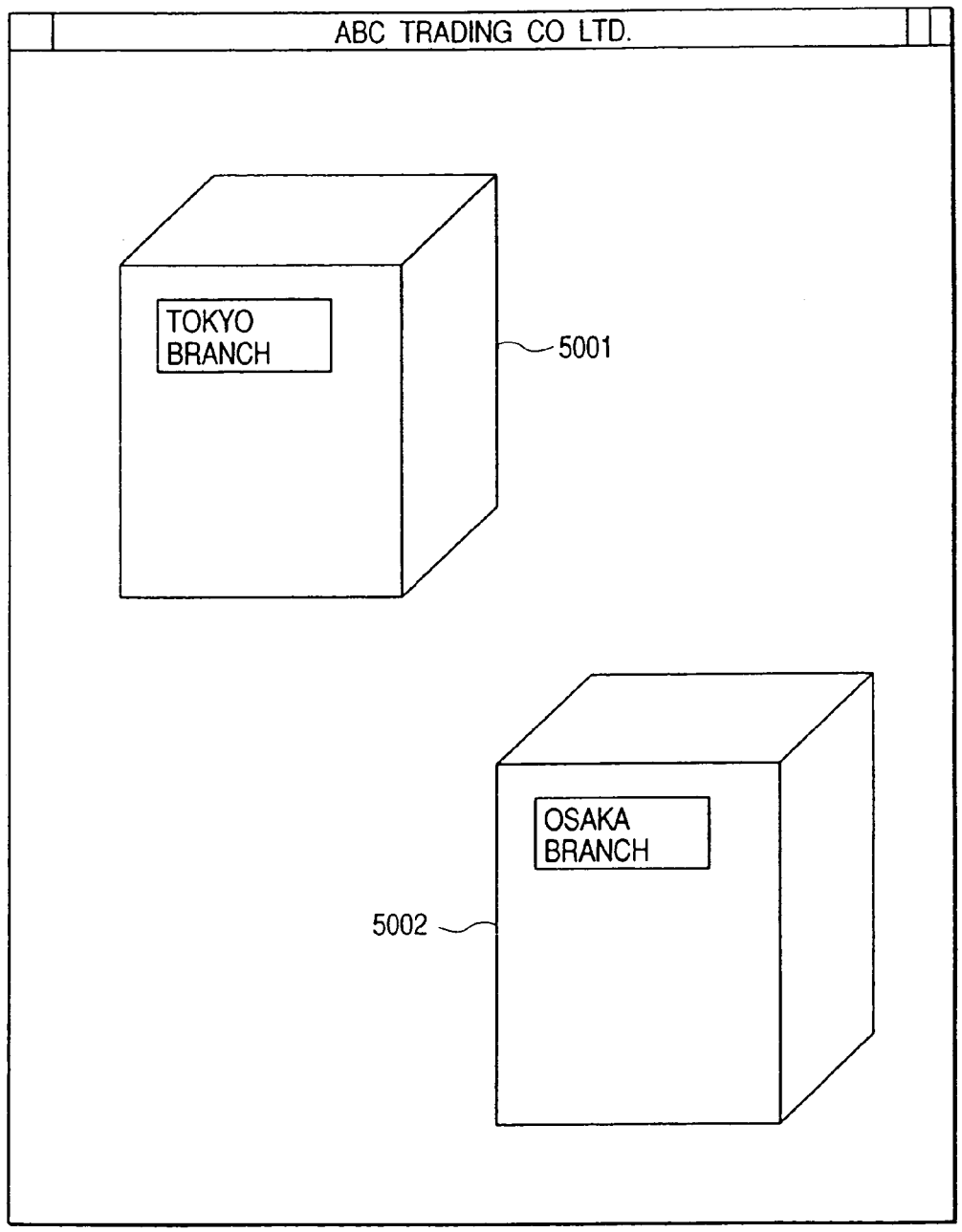
FIG. 33 is a diagram showing a layout bit map corresponding to the attribute of the searched condition.

Next, it is judged at Step S6003 whether the layout bit map corresponding to the searched condition attribute is already displayed. In this example, since the search was executed with the attribute O=attribute value ABC trading Co. Ltd., the searched device icon is displayed on the layout bit map shown in FIG. 33 in accordance with the map correspondence list (shown in FIG. 31). It is checked whether the layout bit map shown in FIG. 33 is already displayed. If not displayed, the layout bit map is displayed at Step S6004 to advance to the process at Step S6005.

If it is judged at Step S6003 that the layout bit map shown in FIG. 33 is already displayed, the attribute and its attribute value are derived from the searched attribute at Step S6005. It is checked at Step S6006 whether the acquired attribute value can be displayed. If the device has an attribute value outside of the predetermined range or is not input with the attribute value, the device cannot be displayed and the flow advances to Step S6011.

It is judged at Step S6011 whether the unknown map is already displayed. If not, the unknown map is displayed at Step S6012, and the device icon corresponding to the NM value acquired at Step S6002 is displayed in the device column of the unknown map (Step S6013).

If it is judged at Step S6006 that the attribute value can be displayed, it is judged whether the lower hierarchical level is the MAP attribute (Step S6007). If not, the flow advances to Step S6008 whereat the device icon corresponding to the NM value acquired at Step S6002 is superposed upon the displayed layout bit map at the attribute position. In this case, the attribute value of the attribute BR one level lower than the hierarchical level O in the hierarchical location information is the Tokyo branch (FIG. 4), and so each device is displayed at the location of the Tokyo branch 5001. The display shown in FIG. 34 can therefore be obtained.

In order to search the location of the device more precisely, the user selects the block name (BL) from the pull-down menu at 1001*a* in the input window shown in FIG. 11, inputs 2-1 as its attribute value 1002*a*, and thereafter activates the search start button 1005.

The client acquires the search result from the server by the method described in the above embodiments. In accordance with the search result acquired from the server, the client displays the device icon on the layout bit map. Namely, the process shown in FIG. 32 is executed. In this case, since the lower hierarchical level attribute information is the map information at Step S6007, the flow advances to Step S6009.

It is checked at Step S6009 whether the coordinate is in the areal range of the layout bit map. If in the areal range, at Step 6010 the device icon corresponding to the NM value acquired at Step S6002 is displayed superposed upon the displayed layout bit map at the coordinate position.

Figure 18:
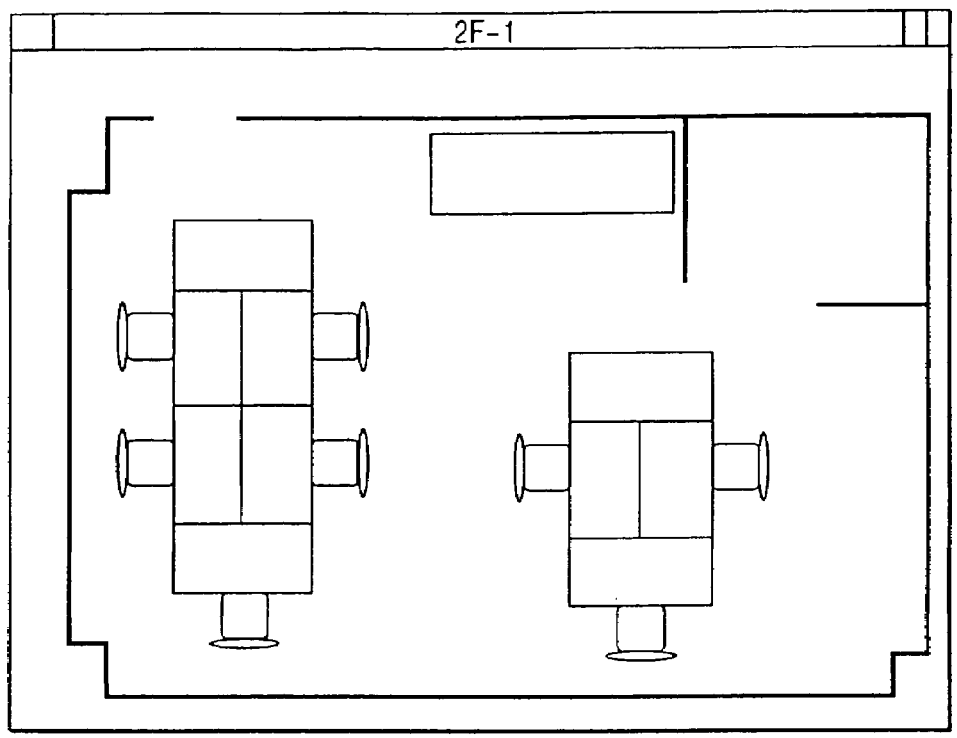
FIG. 18 is a diagram showing a layout bit map managed by the client computer.
Figure 19:
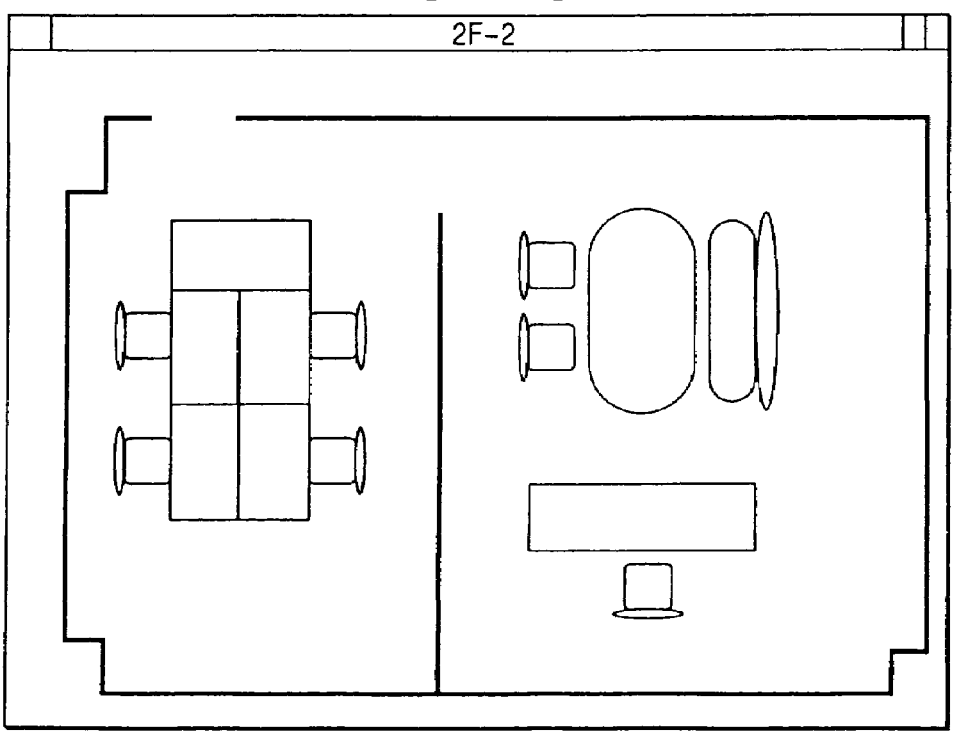
FIG. 19 is a diagram showing a layout bit map managed by the client computer.

In this case, since the search was executed with the attribute value of 2-1 as the block attribute (BL), the layout bit map shown in FIG. 18 is selected by using the map correspondence list shown in FIG. 31, as the layout bit map on which the search result is displayed.

Therefore, as shown in FIG. 15, the device icon corresponding to the searched device is displayed superposed upon the layout bit map shown in FIG. 18.

Other layout bit maps prepared for respective hierarchical levels will be described.

As described earlier, FIG. 33 shows the layout bit map to be used for the search with the attribute O=attribute value ABC trading Co. Ltd. The device with the Tokyo branch as the attribute BR one level lower than the attribute O is displayed at 5001, and the device with the Osaka branch is displayed at 5002.

Figure 34:
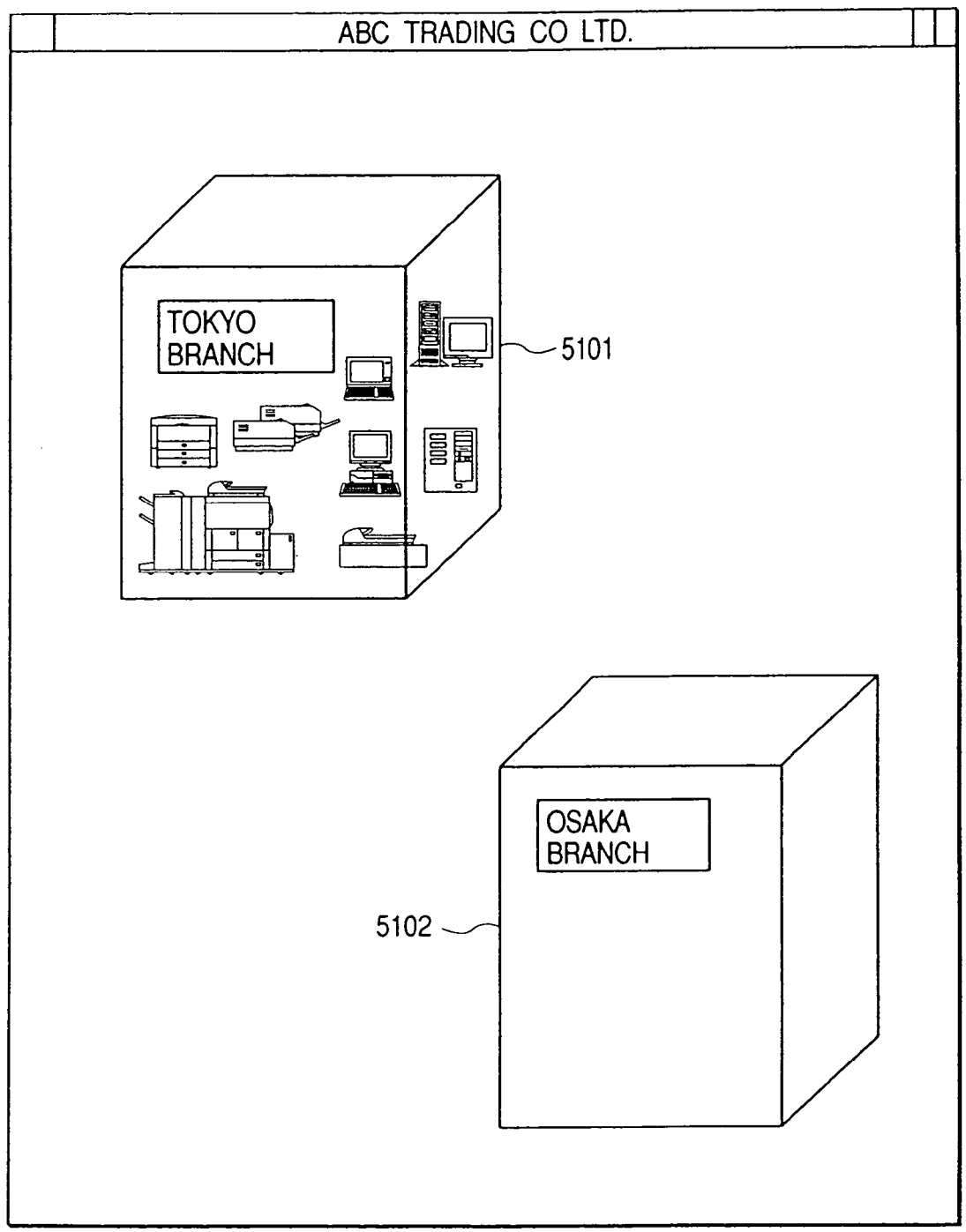
FIG. 34 is a diagram showing an example of displayed devices at locations in a Tokyo branch.

FIG. 34 shows the search result display when all devices are searched with the attribute O=attribute value ABC trading Co. Ltd.

Figure 35:
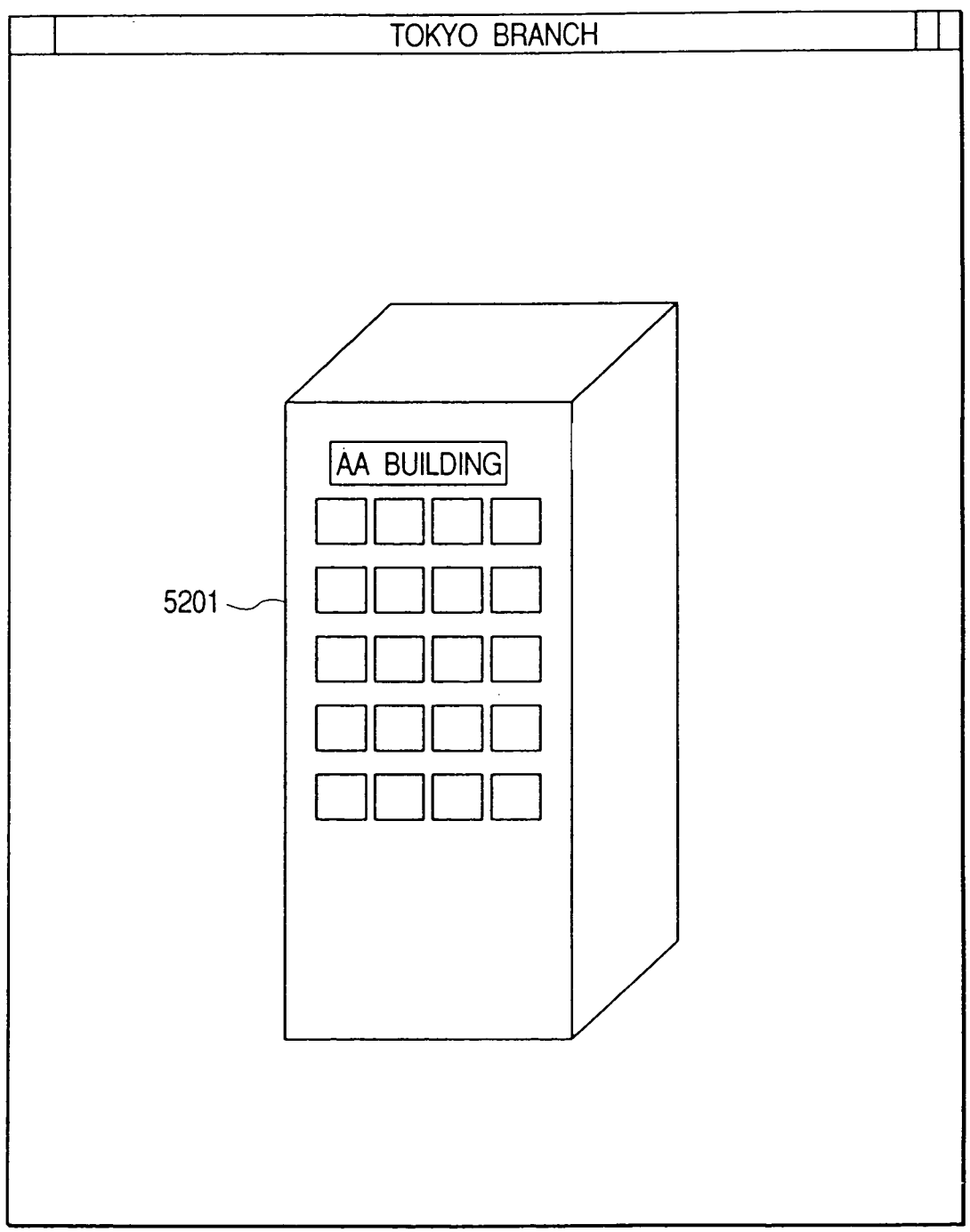
FIG. 35 is a diagram showing a layout bit map to be used for search with attribute BR=attribute value Tokyo branch.

FIG. 35 is the layout bit map for the search with the attribute BR=attribute value Tokyo branch. The attribute one level under the attribute value BR is OP which is an option indicating that the detailed information exists at one lower level. The device having the AA building as its attribute BU is displayed at 5201.

Figure 36:
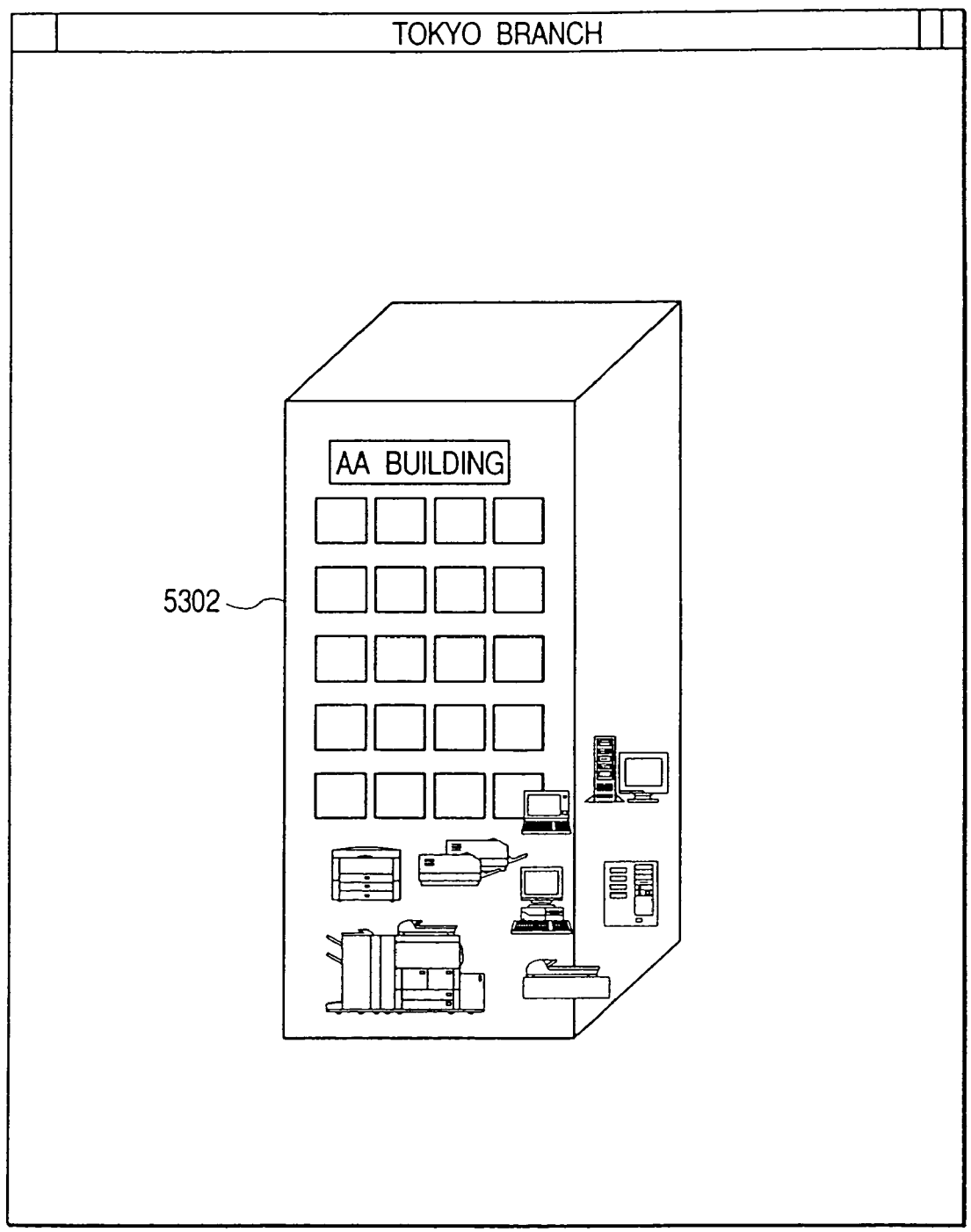
FIG. 36 is a diagram showing an example of the search result when all devices are searched with attribute BR=attribute value Tokyo branch.

FIG. 36 shows the search result display showing a building 5302 when all devices are searched with the attribute BR=attribute value Tokyo branch.

Figure 37:
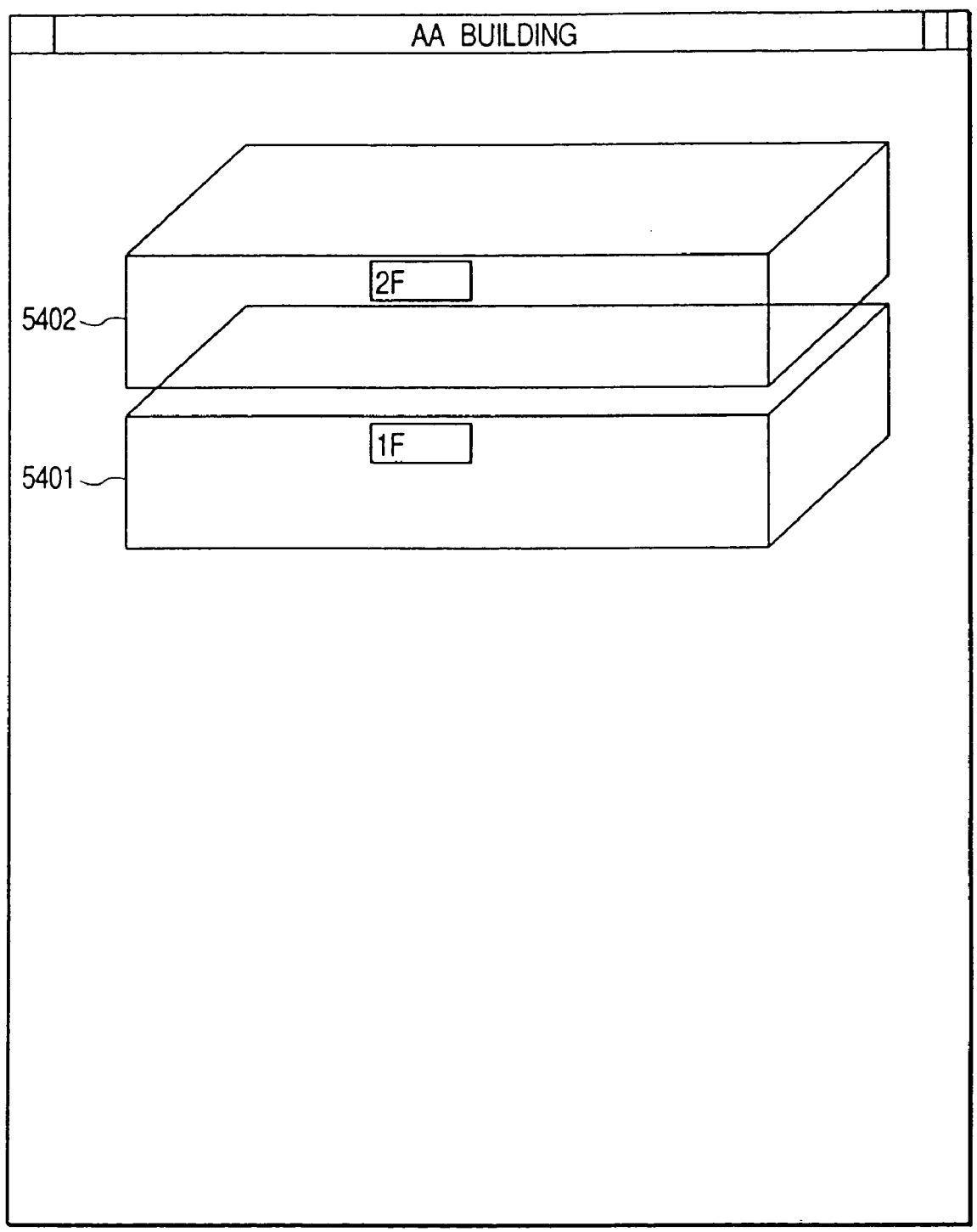
FIG. 37 is a diagram showing a layout bit map for search with attribute BU=attribute value AA building.

FIG. 37 is the layout bit map for the search with the attribute BU=attribute value AA building. The device having 2F as the attribute 2F under the attribute BU is displayed at 5402, and the device having 1F is displayed at 5401.

Figure 38:
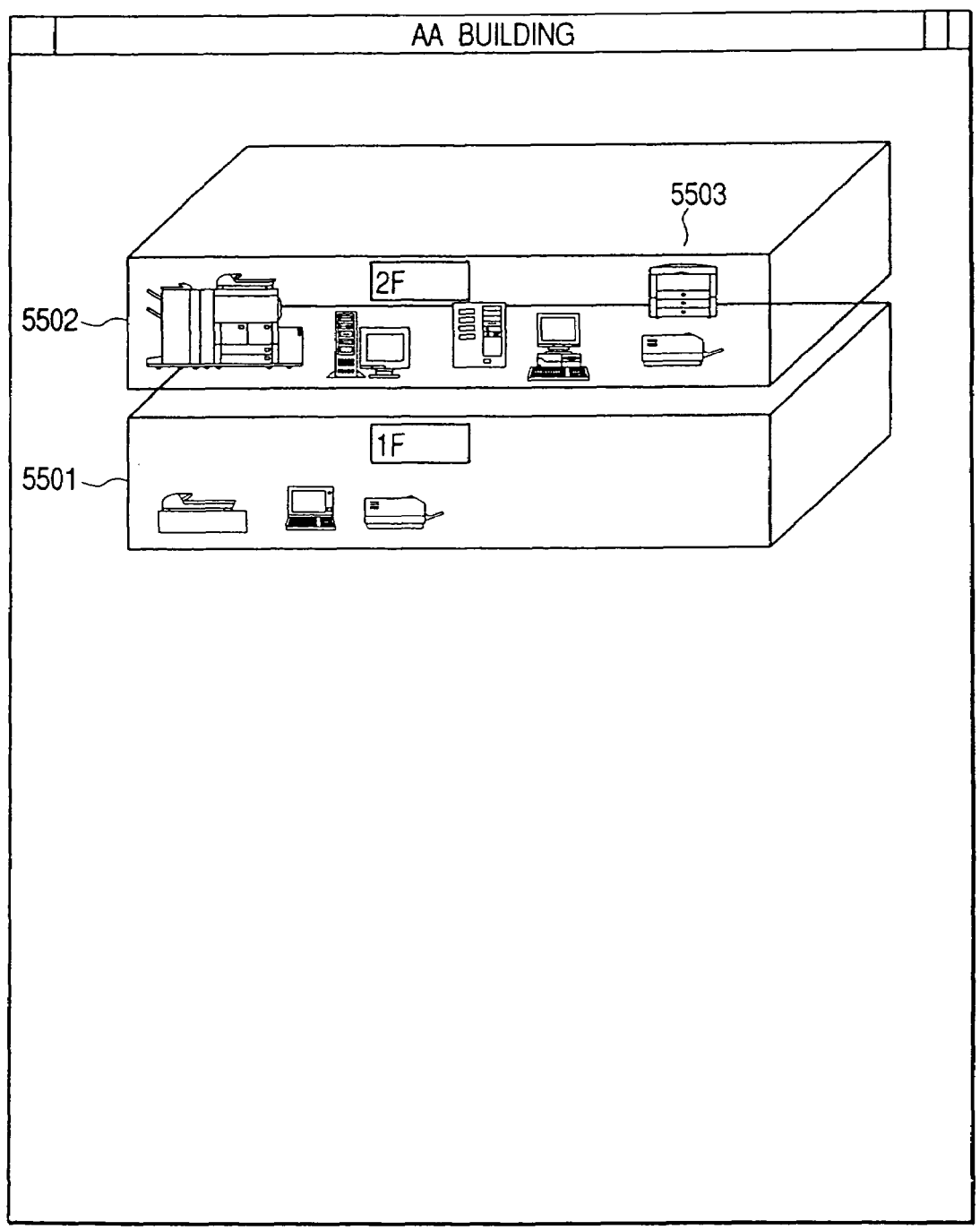
FIG. 38 is a diagram showing an example of the search result when all devices are searched with attribute BU=attribute value AA building.

FIG. 38 shows the search result display when all devices are searched with the attribute BU=attribute value AA building. All devices in a 2F bit map 5502 and 1F bit map 5501 are displayed.

Figure 39:
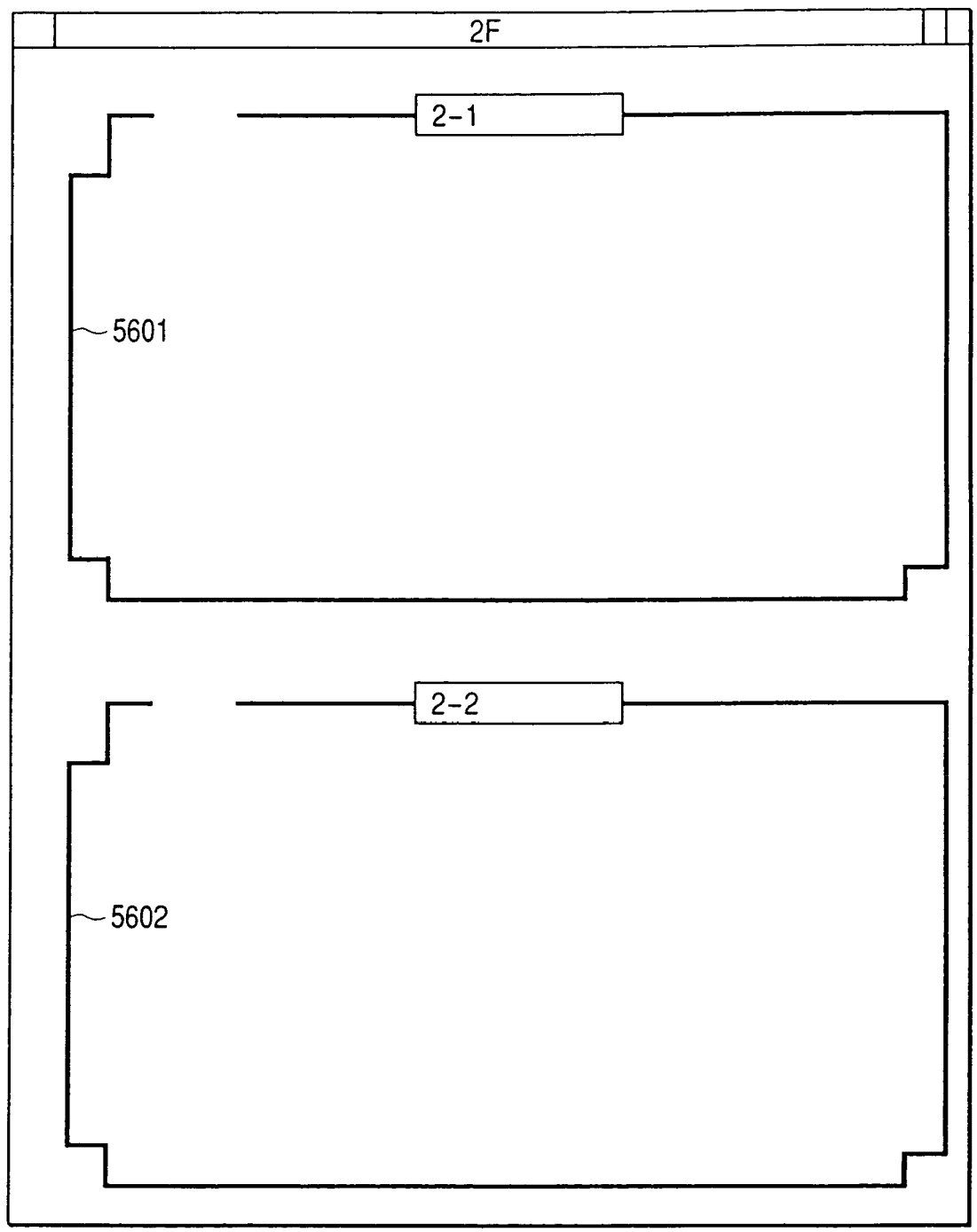
FIG. 39 is a diagram showing a layout bit map for search with attribute FL=attribute value 2F.

FIG. 39 is the layout bit map for the search with the attribute FL=attribute value 2F. The device having 2-1 as the attribute BL under the attribute FL is displayed at 5601, and the device having 2-2 is displayed at 5602.

Figure 40:
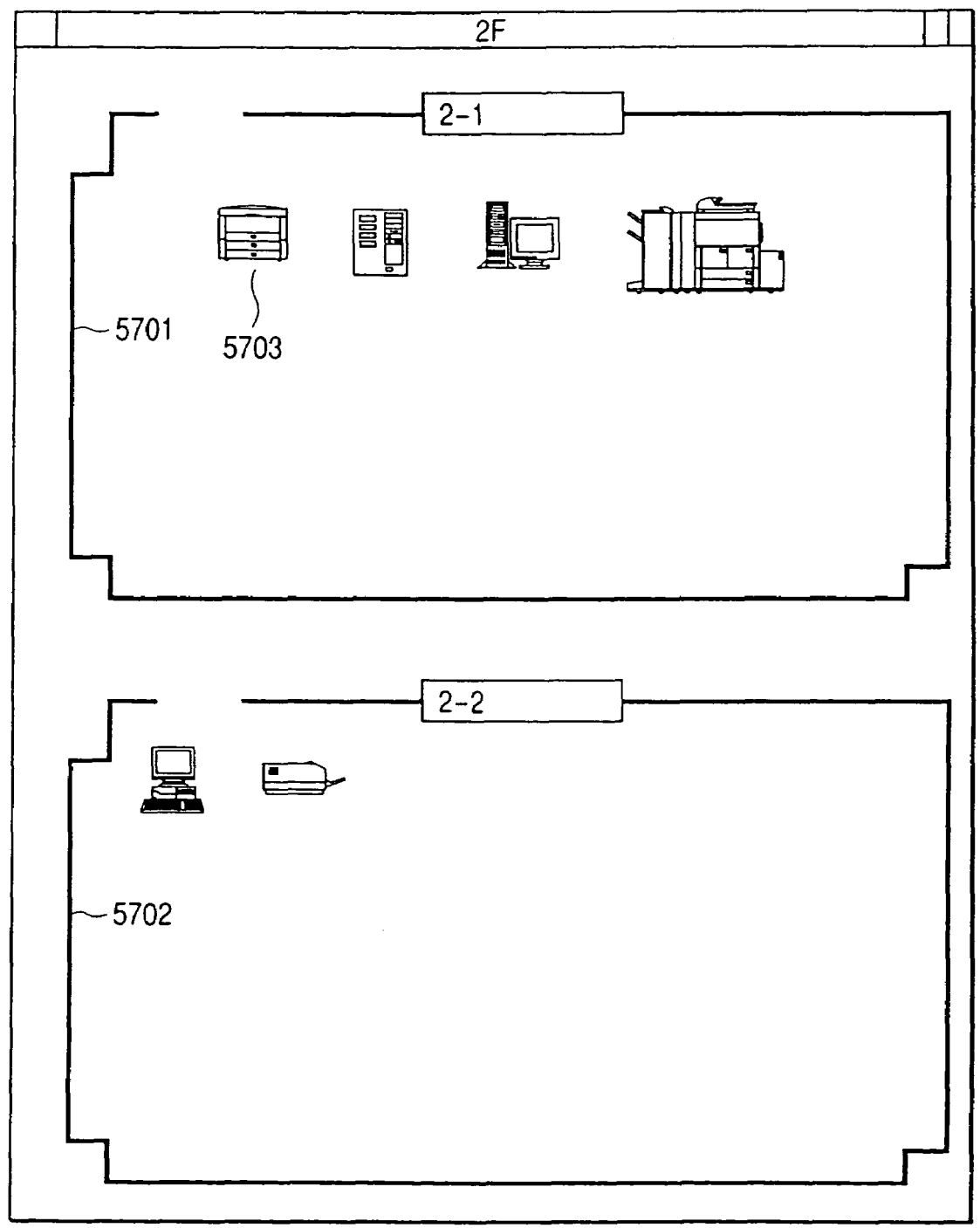
FIG. 40 is a diagram showing an example of the search result when all devices are searched with attribute FL=attribute value 2F.

FIG. 40 shows the search result display when all devices are searched with the attribute FL=attribute value 2F. All devices on a 2F-1 bit map 5701 and a 2F-2 bit map 5702 are displayed.

Figure 41:
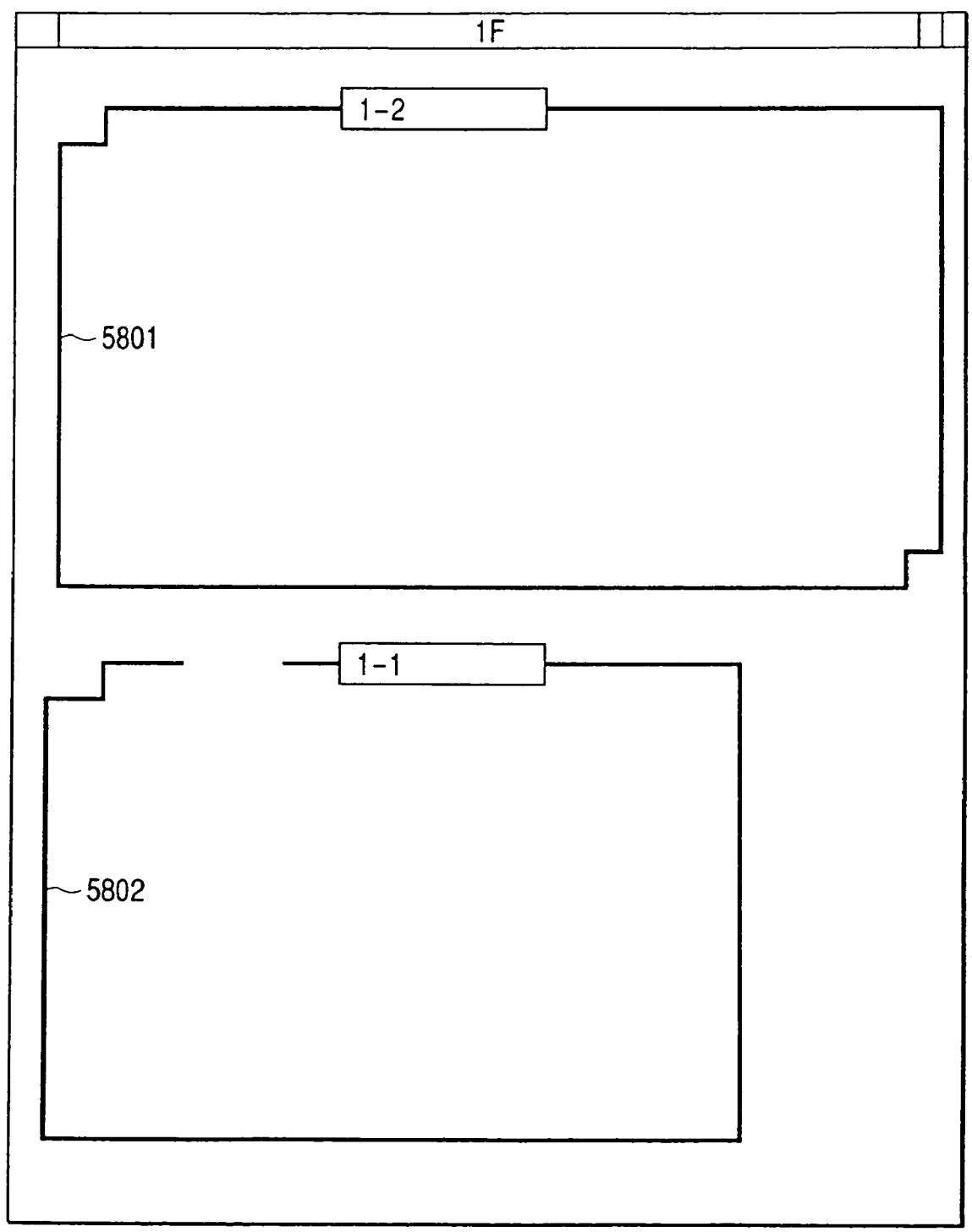
FIG. 41 is a diagram showing a layout bit map for search with attribute FL=attribute value 1F.
Figure 42:
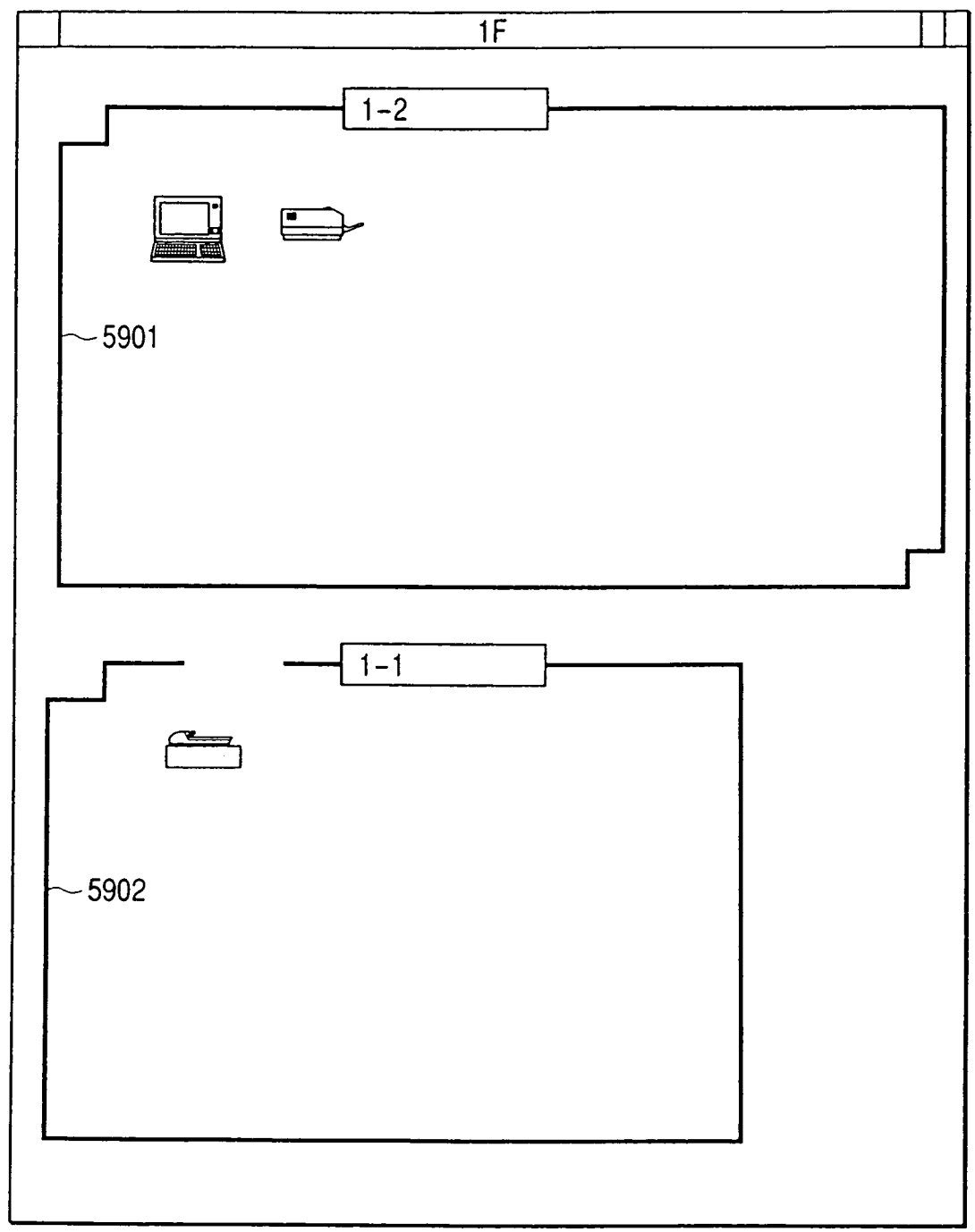
FIG. 42 is a diagram showing an example of the search result when all devices are searched with attribute FL=attribute value 1F.

FIG. 41 is the layout bit map for the search with the attribute FL=attribute value 1F. FIG. 42 shows the search result display when all devices are searched with the attribute FL=attribute value 1F. The device having 1-2 as the attribute BL under the attribute FL is displayed on a bit map 5901 and the device having 1-1 is displayed on a bit map 5902.

Since the layout bit map is stored for each hierarchical level of the hierarchical location information, the search result can be displayed in various display styles at the client 111.

First and second applications will be described assuming that the layout bit map shown in FIG. 38 is displayed on the display of the client 111.

(First Application)

A user selects with a mouse the device having an icon 5503 corresponding to LBP1110 installed on the 2F floor of the layout bit map shown in FIG. 38. In response to this selection, the layout bit map at the block hierarchical level shown in FIG. 5 is displayed so that the user can know the detailed location information of the selected LBP 1110.

A scheme of displaying the layout bit map at the block hierarchical level shown in FIG. 5 in response to the mouse selection operation, will be described. The client 111 has received the attribute information of LBP1110 shown in FIG. 14 from the server 112 as the search result. In accordance with the hierarchical location information indicated by the attribute information 1302 to 1310 of the search result shown in FIG. 14 and the correspondence list shown in FIG. 31, the layout bit map shown in FIG. 18 and the coordinate information on the map can be identified. Therefore, by displaying the icon of LBP1110 on the layout bit map shown in FIG. 18 at the coordinate position, the layout bit map shown in FIG. 5 can be obtained.

If the server 112 stores the layout bit map, the server 112 transmits to the client the layout bit map shown in FIG. 38, first the layout bit map for displaying the search result and then the layout bit map at the block hierarchical level corresponding to the hierarchical location information of each device.

(Second Application)

In the first application, the device icon on the displayed layout bit map (FIG. 38) is selected to display the layout bit map (FIG. 5) at the block hierarchical level which is the lowest hierarchical level of the hierarchical location information. In this manner, the detailed device location information can be obtained from the rough device location information.

In the second application, upon the selection operation with a mouse, the layout bit map is displayed which corresponds to the hierarchical level just under the presently displayed level.

A user selects with a mouse an icon 5503 of the layout bit map (FIG. 38) at the building floor hierarchical level displayed on the display of the client. In response to this selection, a layout bit map (FIG. 40) at the floor hierarchical level is displayed.

Next, the user selects an icon 5703 in the layout bit map (FIG. 40) at the displayed floor hierarchical level. In response to this selection, the layout bit map (FIG. 5) at the block hierarchical level is displayed.

In response to the device icon selection operation by a user, the layout bit maps are sequentially changed to the layout bit map at the hierarchical level just under the level of the hierarchical location information. To this end, in accordance with the hierarchical location information indicated by the attribute information 1302 to 1310 of the search result shown in FIG. 14 and the correspondence list shown in FIG. 31, the layout bit map at the hierarchical level just under the presently displayed layout bit map is selected.

In the second application, a user can have a stepwise detailed layout and know the route to the location where the desired device is installed.

The layout bit map at each hierarchical level of the hierarchical location information to be displayed in a switching manner may be stored in the client 111, or it may be received from the server 112 together with the search result.

According to the third embodiment, the searched device can be displayed on a layout bit map at the hierarchical level desired by a user, including the location information from rough location information at a building level to detailed location information at one block on one floor.

The invention has been described with reference to the first to third embodiments. The invention is applicable to another system which stores the database 800 stored in the hard disk of the server 112 and the layout bit maps, in another apparatus connected thereto via a network.

In this case, in response to a device search request from the client 111, the server 112 accesses the database information and layout bit maps stored in the other apparatus to execute the search process and return the search result to the client 111.

The device search system described above may be realized by using techniques such as WWW techniques. In this case, the server 112 has a WWW server, a database function (DBMS), and a gateway function for interconnecting the WWW server and DBMS. The WWW server supplies a search window constituted of HTML or XML to the client.

The client displays the search window supplied from the WWW server by using browser software, and a user executes a device search by using the displayed search window.

Various data (maps, icons, and the like) transferred to and from the server, clients and devices is constituted of HTML, XML or the like, and HTTP is used as a data transfer protocol.

In order to realize a function not possessed by general browser software at the client, for example, Applet, one kind of JAVA techniques, may be used.

In the above embodiments, computers are used as the client 111 and server 112. The function of the client and the function of the server may be provided to the device such as a scanner, a facsimile and a printer.

For example, by providing a scanner with the function of the client 111, it becomes possible to search a printer suitable for printing original data read with the scanner or a facsimile suitable for transmitted original data read with the scanner.

If the client has a printer function, the layout bit map displayed a searched device may be printed out.

It is obvious that the object of the invention can be achieved by supplying a system or apparatus with a storage medium storing software program codes realizing the functions of each embodiment described above, and by reading and executing the programs codes stored in the storage medium by a computer (CPU or MPU) of the system and apparatus.

In such a case, the program codes themselves read from the storage medium realize the functions of each embodiment. Therefore, the program code themselves and means for supplying the program codes to a computer, e.g., a storage medium storing such program codes constitute the present invention.

The storage medium for storing such program codes may be a floppy disk, a hard disk, an optical disk, a magnetooptical disk, a. CD-ROM, a magnetic tape, a nonvolatile memory card, a ROM or the like.

Figure 30:
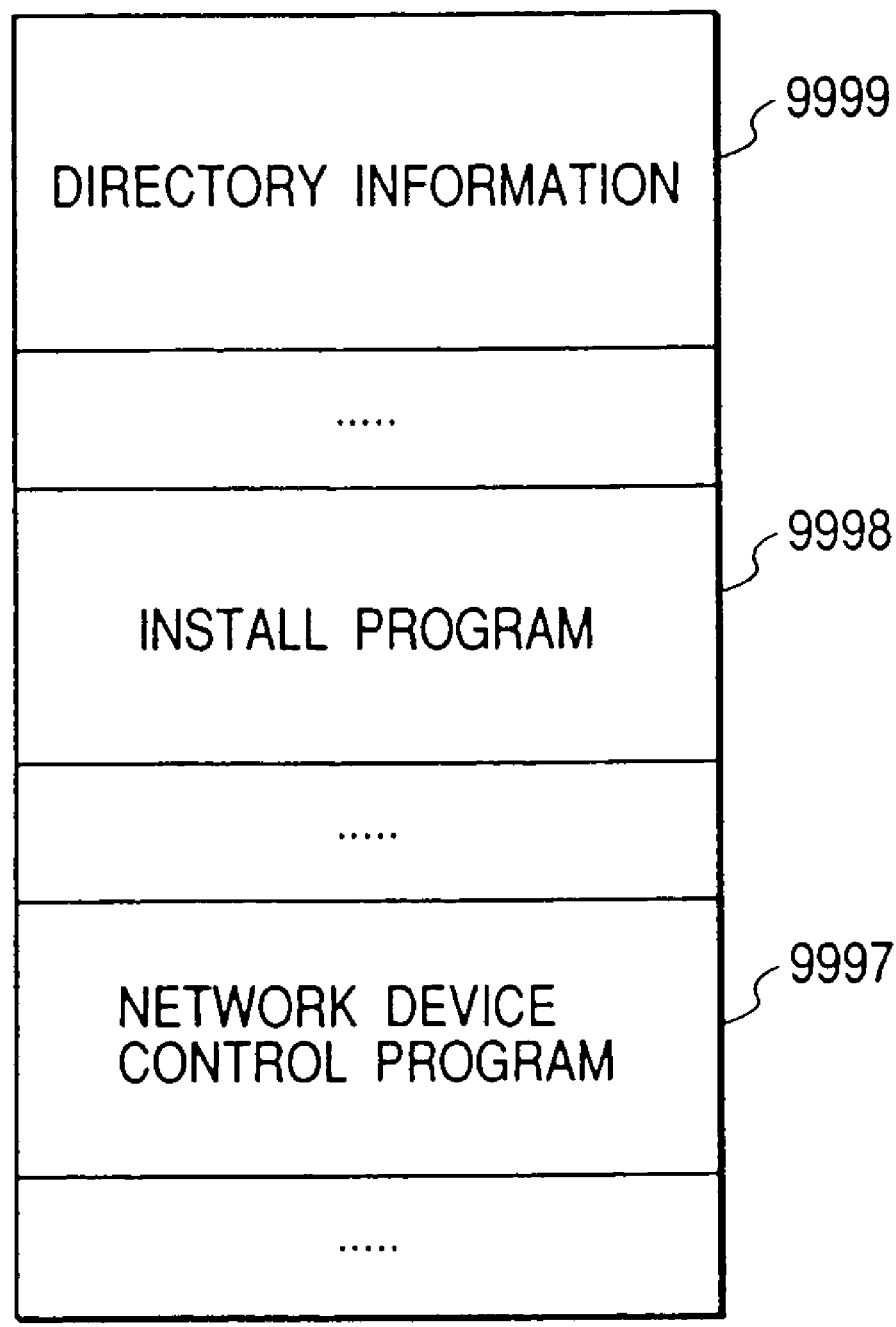
FIG. 30 is a diagram showing a memory map of a CD ROM.

FIG. 30 shows a memory map of a CD-ROM as an example of the storage medium.

In FIG. 30, reference numeral 9999 represents an area storing directory information which indicates the location of an area 9998 storing installing programs and an area 9997 storing network device control programs.

The area 9998 stores the installing programs. The area 9997 stores the network device control programs. When the network device control programs are to be installed in PC 200, the installing programs stored in the area 9998 are loaded in the system and executed by CPU 202.

The installing programs executed by CPU 202 read the network device control programs from the area 9997 and load them in the hard disk 211.

It is obvious that the scope of the invention also contains not only the case wherein the functions of each embodiment can be realized by executing the program codes read by a computer, but also the case wherein the functions of each embodiment can be realized by executing a portion or the whole of processes by an OS running on the computer or other application software, in accordance with the program codes.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

What is claimed is:

1. An information processing apparatus for searching for a device on a network, comprising:
 a reception unit that receives, from the device on the network, location information of said device at a first hierarchical level and location information of said device at a hierarchical level higher than the first hierarchical level, respectively;
 a memory that stores the location information respectively received by said reception unit;
 a search unit that searches for, according to a search condition received from another information processing apparatus, a device which satisfies the search condition from said memory, the search condition including the location information at the first hierarchical level or the location information at the hierarchical level higher than the first hierarchical level;
 a generation unit that generates a search result by said search unit, the search result including the location information of the searched device at the first hierarchical level and the location information of the searched device at the hierarchical level higher than the first hierarchical level; and
 a transmission unit that transmits the search result generated by the generation unit to the another information processing apparatus,
 wherein said memory stores map data corresponding to the first hierarchical level and map data corresponding to the hierarchical level higher than the first hierarchical level, and the map data is used to display a location of the device, and
 said transmission unit transmits the map data corresponding to the first hierarchical level and the map data corresponding to the hierarchical level higher than the first hierarchical level, to the another information processing apparatus.

2. An information processing apparatus according to claim 1, wherein
 said reception unit receives, from the device on the network, coordinate information indicating the location of said device on a map corresponding to the first hierarchical level, and
 said transmission unit transmits the coordinate information to the another information processing apparatus.

3. An information processing apparatus according to claim 2, wherein said memory stores icon data indicating said device, and
 said transmission unit transmits the icon data to the another information processing apparatus.

4. An information processing method of searching for a device on a network, comprising the steps of:
 a reception step of receiving, from the device on the network, location information of said device at a first hierarchical level and location information of said device at a hierarchical level higher than the first hierarchical level, respectively;
 a storing step of storing in a memory the location information respectively received by said reception step;
 a search step of searching for, according to a search condition received from another information processing apparatus, a device which satisfies the search condition from said memory, the search condition including the location information at the first hierarchical level or the location information at the hierarchical level higher than the first hierarchical level;
 a generation step of generating a search result by said search step, the search result including the location information of the searched device at the first hierarchical level and the location information of the searched device at the hierarchical level higher than the first hierarchical level; and
 a transmission step of transmitting the search result generated by the generating step to the another information processing apparatus,
 wherein said memory stores map data corresponding to the first hierarchical level and map data corresponding to the hierarchical level higher than the first hierarchical level, and the map data is used to display a location of the device, and
 said transmission step transmits the map data corresponding to the first hierarchical level and the map data corresponding to the hierarchical level higher than the first hierarchical level, to the another information processing apparatus.

5. An information processing method according to claim 4, wherein said reception step receives, from the device on the network, coordinate information indicating the location of said device on a map corresponding to the first hierarchical level, and
 said transmission step transmits the coordinate information to the another information processing apparatus.

6. An information processing method according to claim 5, wherein said memory stores icon data indicating said device, and
 said transmission step transmits the icon data to the another information processing apparatus.

7. A computer-readable storage medium on which is stored a computer program to be executed by an information processing apparatus for searching for a device on a network, the computer program comprising:
 a reception step of receiving, from the device on the network, location information of said device at a first hierarchical level and location information of said device at a hierarchical level higher than the first hierarchical level, respectively;
 a storing step of storing in a memory the location information respectively received by said reception step;
 a search step of searching for, according to a search condition received from another information processing apparatus, a device which satisfies the search condition from said memory, the search condition including the location information at the first hierarchical level or the location information at the hierarchical level higher than the first hierarchical level;
 a generation step of generating a search result by said search step, the search result including the location information of the searched device at the first hierarchical level and the location information of the searched device at the hierarchical level higher than the first hierarchical level; and
 a transmission step of transmitting the search result generated by the generating step to the another information processing apparatus,
 wherein said memory stores map data corresponding to the first hierarchical level and map data corresponding to the hierarchical level higher than the first hierarchical level, and the map data is used to display a location of the device, and
 said transmission step transmits the map data corresponding to the first hierarchical level and the map data corresponding to the hierarchical level higher than the first hierarchical level, to the another information processing apparatus.

8. An information processing apparatus for searching for a device on a network, comprising:
- a reception unit that receives, from the device on the network, location information of said device at a first hierarchical level and location information of said device at a hierarchical level higher than the first hierarchical level, respectively;
- a memory that stores the location information respectively received by said reception unit;
- a search unit that searches for, according to a search condition received from another information processing apparatus, a device which satisfies the search condition from said memory, the search condition including the location information at the first hierarchical level or the location information at the hierarchical level higher than the first hierarchical level;
- a generation unit that generates a search result by said search unit, the search result including the location information of the searched device at the first hierarchical level and the location information of the searched device at the hierarchical level higher than the first hierarchical level; and
- a transmission unit that transmits the search result generated by the generation unit to the another information processing apparatus,
- wherein the first hierarchical level corresponds to a block of a floor in a building and the hierarchical level higher than the first hierarchical level corresponds to the floor.

9. An information processing method for searching for a device on a network, comprising:
- a reception step of receiving, from the device on the network, location information of said device at a first hierarchical level and location information of said device at a hierarchical level higher than the first hierarchical level, respectively;
- a storing step of storing in a memory the location information respectively received by said reception step;
- a search step of searching for, according to a search condition received from another information processing apparatus, a device which satisfies the search condition from said memory, the search condition including the location information at the first hierarchical level or the location information at the hierarchical level higher than the first hierarchical level;
- a generation step of generating a search result by said search step, the search result including the location information of the searched device at the first hierarchical level and the location information of the searched device at the hierarchical level higher than the first hierarchical level; and
- a transmission step of transmitting the search result generated by the generation step to the another information processing apparatus,
- wherein the first hierarchical level corresponds to a block of a floor in a building and the hierarchical level higher than the first hierarchical level corresponds to the floor.

* * * * *